(12) United States Patent
Ando et al.

(10) Patent No.: US 6,740,454 B1
(45) Date of Patent: May 25, 2004

(54) ORGANIC ELECTROLYTIC CELL WITH A POROUS CURRENT COLLECTOR

(75) Inventors: Nobuo Ando, Osaka (JP); Masaki Yamaguchi, Yao (JP); Yukinori Hato, Hofu (JP)

(73) Assignee: Kanebo Limited, Tokyo (JP)

( * ) Notice: Subject to any disclaimer, the term of this patent is extended or adjusted under 35 U.S.C. 154(b) by 0 days.

(21) Appl. No.: 09/744,687

(22) PCT Filed: Jul. 27, 1998

(86) PCT No.: PCT/JP98/03366

§ 371 (c)(1),
(2), (4) Date: Jan. 29, 2001

(87) PCT Pub. No.: WO00/07255

PCT Pub. Date: Feb. 10, 2000

(51) Int. Cl.[7] .......................... H01M 4/70; H01M 4/38; H01M 10/14
(52) U.S. Cl. .................. 429/231.95; 429/241; 429/243
(58) Field of Search .......................... 429/213, 231.95, 429/241, 243

(56) References Cited

U.S. PATENT DOCUMENTS

| | | | | |
|---|---|---|---|---|
| 5,750,287 A | * | 5/1998 | Kinoshita | .................... 429/218 |
| 6,461,769 B1 | * | 10/2002 | Ando | .................... 429/231.95 |

FOREIGN PATENT DOCUMENTS

| | | | | |
|---|---|---|---|---|
| JP | 5144471 | 6/1993 | | |
| JP | 5144473 | 6/1993 | | |
| JP | 5251111 | 9/1993 | | |
| JP | 8162159 | 6/1996 | | |
| JP | 8162160 | 6/1996 | | |
| JP | 8162161 | 6/1996 | | |
| JP | 8162162 | 6/1996 | | |
| JP | 8255633 | 10/1996 | | |
| JP | 08-255633 | * 10/1996 | .......... H01M/10/40 |
| JP | 09-102328 | * 4/1997 | .......... H01M/10/40 |
| WO | WO9508852 | 3/1995 | | |

* cited by examiner

Primary Examiner—Mark Ruthkosky
(74) Attorney, Agent, or Firm—Morgan & Finnegan, LLP

(57) ABSTRACT

An organic electrolytic cell having a positive electrode, a negative electrode, and an electrolyte comprising a solution of a lithium salt in an aprotic organic solvent, wherein a positive electrode collector and a negative electrode collector have pores that penetrate from the front surface to the back surface, a positive electrode active material and a negative electrode active material can reversibly carry lithium, and, when the lithium derived from the negative electrode or the positive electrode is in electrochemical contact with the lithium disposed opposite the negative electrode or the positive electrode, the whole or part of the lithium passes through at least one layer of the positive electrode or the negative electrode and is carried. The opposing area of the lithium is not larger than 40 % of the area of the negative electrode and the porosity of each current collector is not less than 1 % and not more than 30 %.

7 Claims, 10 Drawing Sheets

One example of electrodes using an expanded metal
(We call punching metal) having a porosity of 7%

One example of electrodes using an expanded metal
(We call punching metal) having a porosity of 80%

ORGANIC ELECTROLYTIC CELL WITH A
POROUS CURRENT COLLECTOR

TECHNICAL FIELD

The present invention relates to an organic electrolytic cell, which has a high capacity and high voltage and is superior in charge and discharge characteristics and safety.

BACKGROUND ART

In recent years, a secondary cell wherein an electrically conductive polymer, an oxide of a transition metal or the like is used as the positive electrode, and metallic lithium or a lithium alloy is used as the negative electrode has been proposed as a cell to be used in place of Ni—Cd cells and lead-acid cells, because of its high energy density.

However, when such a secondary cell is subjected to repeated charge and discharge, its capacity is largely lowered due to deterioration of the positive or negative electrode, and thus there still remains a problem in its practical aspect. Particularly by deterioration of the negative electrode, mossy lithium, called dendrites, are formed, and through repeated charge and discharge, the dendrites finally pierce the separator and cause short-circuit. In some case, the cell is broken and thus there has been a problem in safety, too.

To solve the above problems, there has been proposed a cell wherein a carbon material such as graphite is used as the negative electrode and a lithium-containing metallic oxide such as $LiCoO_2$ is used as the positive electrode. This cell is a so-called rocking chair-type cell wherein, after assembly of the cell, lithium is supplied from the lithium-containing metallic oxide as the positive electrode to the negative electrode through charge, and lithium of the negative electrode is returned to the positive electrode through discharge. Although the cell is characterized by a high voltage and high capacity, the high energy density as an advantage of the lithium cells has not been obtained.

In recent years, with the rapid progress of a study about a negative electrode material capable of reversibly carrying lithium, a material capable of carrying lithium in the amount exceeding that of $C_6Li$, which is a theoretic amount of the carbon material, and an oxide of tin have been proposed as the negative electrode material for high-capacity lithium secondary cells. Among them, an infusible and insoluble substrate having a polyacene skeletal structure and a hydrogen/carbon atomic ratio of 0.5 to 0.05, the substrate being a heat-treated product of an aromatic condensation polymer, is capable of doping with lithium up to $C_2Li$ (Synthetic Metals, 73 (1995) P273). However, the above locking chair-type cell wherein this infusible and insoluble substrate is used as the negative electrode and the lithium-containing metallic oxide as the positive electrode can attain a capacity higher than that in the case of the carbon material after assembly, but there still remains an unsatisfactory respect in its capacity.

To solve the above problems, PCT Publication No. WO95/8852, whose application was filed by the present applicant, has proposed an organic electrolytic cell comprising a positive electrode, a negative electrode and a solution of lithium salt in an aprotic organic solvent as an electrolytic solution, wherein the positive electrode contains a metallic oxide, the negative electrode is an infusible and insoluble substrate having a polyacene skeletal structure and a hydrogen/carbon atomic ratio of 0.5 to 0.05, the substrate being a heat-treated product of an aromatic condensation polymer, and the total amount of lithium contained in the cell is not less than 500 mAh/g and the amount of lithium contained in the cell is not less than 100 mAh/g, based on the infusible and insoluble substrate as the negative electrode. Although this cell can attain a high capacity, a method of carrying lithium originating in the negative electrode, practically and simply, is required in the case of assembly of a practical cell such as cylindrical-type cell. Various specific methods thereof are proposed in Japanese Patent Kokai (Laid-Open) Publication Nos. 162159/1996, 162160/1996, 162161/1996 and 255633/1996. However, any of these methods has a problem in uniformity and operating property and the problem has still to be completely solved at present. That is, a most simple method in these specific methods includes a method of attaching a lithium metal on a positive or negative electrode, inserting the resultant into a cell container, together with the positive or negative electrode and a separator, pouring an electrolytic solution and allowing to stand, thereby to carry lithium on the positive or negative electrode. However, this method had such a problem that, since a lower limit of the thickness of a lithium metal foil to be attached, which can be mass-produced, is about 30 μm, the thickness of the positive and/or negative electrodes increases thereby to restrict design of the cell and to exert an influence particularly on charge and discharge characteristics.

The present inventors have studied intensively in light of the problems described above, thus completing the present invention. An object of the present invention is to provide an organic electrolytic cell, which is easy to produce, and which has a high capacity and high voltage.

Another object of the present invention is to provide a secondary cell, which is superior in charge and discharge characteristics.

Still another object of the present invention is to provide a secondary cell, which is capable of charging and discharging for a long period and is superior in safety.

A further object of the present invention is to provide a secondary cell having a low internal resistance.

A still further object of the present invention is to provide a secondary cell, which is easy to produce.

Still another objects, features and advantages of the present invention will become apparent from the following description.

DISCLOSURE OF THE INVENTION

To attain these objects, the organic electrolytic cell of the present invention has the following construction. That is, the present invention provides an organic electrolytic cell comprising a positive electrode, a negative electrode and a solution of lithium salt in an aprotic organic solvent as an electrolytic solution, wherein a current collector of the positive electrode and a current collector of the negative electrode are respectively provided with pores piercing from the front surface to the back surface, an active material of negative electrode is capable of reversibly carrying lithium, and lithium originating in the negative electrode is carried on the negative electrode by electrochemical contact with the lithium arranged to face the positive or negative electrode, thereby enabling all or a portion of lithium to permeate into at least one layer of the positive or negative electrode.

It is preferred that a current collector of the positive electrode and a current collector of the negative electrode in the organic electrolytic cell are respectively provided with pores piercing from the front surface to the back surface and a porosity of each current collector is not less than 1% and not more than 30%, an active material of the negative electrode is capable of reversibly carrying lithium, and lithium originating in the negative electrode is carried by electrochemical contact with lithium arranged to face the negative or positive electrode and an opposed area of lithium is not more than 40% of an area of the negative electrode.

The present invention also provides an organic electrolytic cell comprising a positive electrode, a negative electrode and a solution of lithium salt in an aprotic organic solvent as an electrolytic solution, wherein a current collector of the positive electrode and a current collector of the negative electrode are respectively provided with pores piercing from the front surface to the back surface, an active material of the positive electrode and an active material of the negative electrode are capable of reversibly carrying lithium, and lithium originating in the positive electrode is carried on the positive electrode by electrochemical contact with lithium arranged to face the negative or positive electrode, thereby enabling all or a portion of lithium to permeate into at least one layer of the positive or negative electrode.

The active material of the negative electrode is preferably an infusible and insoluble substrate having a polyacene skeletal structure and a hydrogen/carbon atomic ratio of 0.5 to 0.05, the substrate being a heat-treated product of an aromatic condensation polymer.

In the organic electrolytic cell according to claim 1 or claim 7, the total amount of lithium contained the cell is not less than 500 mAh/g and the amount of lithium originating in the negative electrode is not less than 100 mAh/g, based on the active material of the negative electrode.

The present invention also provides an organic electrolytic cell comprising a positive electrode, a negative electrode and a solution of lithium salt in an aprotic organic solvent as an electrolytic solution, wherein a current collector of the positive electrode and a current collector of the negative electrode are respectively provided with pores piercing from the front surface to the back surface and a porosity of each current collector is not less than 1% and not more than 30%, an active material of the positive electrode and an active material of the negative electrode are capable of reversibly carrying lithium, and at least one portion of lithium originating in the positive electrode is carried by electrochemical contact with lithium arranged to face the negative or positive electrode and an opposed area of lithium is not more than 40% of an area of the positive electrode.

The active material of the negative electrode is preferably an infusible and insoluble substrate having a polyacene skeletal structure and a hydrogen/carbon atomic ratio of 0.5 to 0.05, the substrate being a heat-treated product of an aromatic condensation polymer.

The active material of negative electrode in the organic electrolytic cell of the present invention may be any one capable of reversibly carrying lithium, and examples thereof include graphite, various carbon materials, polyacene substance, tin oxide, silicon oxide and the like. Among them, it is preferred to use an infusible and insoluble substrate having a polyacene skeletal structure and a hydrogen/carbon atomic ratio of 0.5 to 0.05, the substrate being a heat-treated product of an aromatic condensation polymer, because a high capacity can be obtained.

The aromatic condensation polymer is a condensate of an aromatic hydrocarbon compound and aldehydes. As the aromatic hydrocarbon compound, for example, so-called phenols such as phenol, cresol, xylenol and the like can be suitably used. There can also be used methylenebisphenols represented by the following formula:

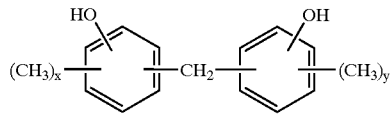

wherein x and y are independently 0, 1 or 2, or hydroxybiphenyls or hydroxynaphthalenes. For practical purpose, phenols, particularly phenol, are preferred.

As the aromatic condensation polymer, there can also be used a modified aromatic condensation polymer wherein a portion of the aromatic hydrocarbon compound having phenolic hydroxyl groups is replaced with an aromatic hydrocarbon compound having no phenolic hydroxyl group such as xylene, toluene or aniline, for example, a condensate of phenol, xylene and formaldehyde. Furthermore, there can also be used a modified aromatic polymer wherein the above portion is replaced with melamine or urea. A furan resin is also preferred.

As the aldehyde, it is possible to use aldehydes such as formaldehyde, acetaldehyde and furfural, but formaldehyde is preferred. A phenolformaldehyde condensate may be any of a novolak type, a resol type or a mixture thereof.

The infusible and insoluble substrate can be obtained by a heat treatment of the above aromatic polymer, and includes all of infusible and insoluble substrates having a polyacene skeletal structure described in Japanese Patent Publication Nos. 44212/1989 and 24024/1991.

The infusible and insoluble substrate used in the present invention can also be produced as follows. That is, an infusible and insoluble substrate having a hydrogen/carbon atomic ratio (hereinafter referred to as H/C) of 0.5 to 0.05, preferably 0.35 to 0.10 can be obtained by gradually heating the aromatic condensation polymer up to a proper temperature of 400 to 800° C. in a non-oxidizing atmosphere (including a vacuum).

It is also possible to obtain an infusible and insoluble substrate having a specific surface area, measured by the BET method, of not less than 600 m$^2$/g according to the method described in Japanese Patent Publication No. 24024/1991. For example, an infusible and insoluble substrate having the above H/C and having a specific surface area, measured by the BET method, of not less than 600 m$^2$/g can also be obtained by preparing a solution containing a initial condensate of an aromatic condensation polymer and an inorganic salt such as zinc chloride; heating the solution to cure it in a mold; gradually heating the cured matter in a non-oxidizing atmosphere (including a vacuum) up to a temperature of 350 to 800° C., preferably up to a proper temperature of 400 to 750° C.; and then sufficiently washing it with water, diluted hydrochloric acid or the like.

With respect to the infusible and insoluble substrate used in the present invention, according to X-ray diffraction (CuKα), the main peak is observed at 2θ=24° or below, and besides another broad peak is observed at between 2θ=41° and 2θ=46°, in addition to the main peak. Namely, it is suggested that the infusible and insoluble substrate has a polyacene skeletal structure wherein an aromatic polycyclic structure is moderately developed, and takes an amorphous structure. Thus the substrate can be doped stably with lithium and, therefore, it is useful as an active material for cells.

It is preferred that this infusible and insoluble substrate has H/C ranging from 0.5 to 0.05. When H/C exceeds 0.5, the aromatic polycyclic structure does not sufficiently develop, and thus it is impossible to conduct doping and undoping of lithium smoothly, and when a cell is assembled, charge and discharge efficiency is lowered. On the other hand, when H/C is less than 0.05, the capacity of the cell of the present invention is likely to be lowered.

The negative electrode in the organic electrolytic cell according to the present invention is composed of the above infusible and insoluble substrate (hereinafter referred to as PAS), and practically, it is preferred to use a form obtained by forming PAS in an easily formable form such as a powdery form, a granular form or a short fiber form with a binder. As the binder, there can be used fluorine-containing resins such as polyethylene tetrafluoride and polyvinylidene fluoride, and thermoplastic resins such as polypropylene and polyethylene. It is preferred to use a fluorine binder. Use of a fluorine binder having a fluorine/carbon atomic ratio (hereinafter referred to as F/C) of less than 1.5 and not less than 0.75 is preferred, and use of a fluorine binder having a fluorine/carbon atomic ratio of less than 1.3 and not less than 0.75 is more preferred.

The fluorine binder includes, for example, polyvinylidene fluoride, vinylidene fluoride-ethylene trifluoride copolymer, ethylene-ethylene tetrafluoride copolymer, propylene-ethylene tetrafluoride or the like. Furthermore, it is also possible to use a fluorine-containing polymer wherein hydrogens at the principal chain are replaced with alkyl groups. In the case of the polyvinylidene fluoride, F/C is 1. In the case of the vinylidene fluoride-ethylene trifluoride copolymer, when the molar fractions of vinylidene fluoride are 50% and 80%, F/C values become 1.25 and 1.1, respectively. In the case of thepropylene-ethylene tetrafluoride copolymer, when the molar fraction of propylene is 50%, F/C becomes 0.75. Among them, polyvinylidene fluoride, and a vinylidene fluoride-ethylene trifluoride copolymer wherein the molar fraction of vinylidene fluoride is not less than 50% are preferred. For practical purpose, polyvinylidene fluoride is preferred.

When using these binders, it is possible to sufficiently utilize the doping ability (capacity) with lithium which PAS has.

When using PAS, oxide or the like as the active material of negative electrode, if necessary, electrically conductive materials such as acetylene black, graphite, metallic powder and the like may be appropriately added in the negative electrode of the organic electrolytic cell of the present invention.

The active material of positive electrode in the organic electrolytic cell according to claim 1 of the present invention is not specifically limited, but there can be used lithium-containing metallic oxides capable of electrochemically doping with lithium and electrochemically undoping lithium, which can be represented by the general formula $LixMyOz$ (M is a metal, or can be two or more metals) such as $LixCoO_2$, $LixNiO_2$, $LixMnO_2$ or $LixFeO_2$, or oxides of transition metals such as cobalt, manganese and nickel. The above electrically conductive polymers such as PAS can also be suitably used. Particularly, when a high voltage and high capacity are required, a lithium-containing oxide having a voltage of not less than 4 V vs lithium metal is preferred. Among them, lithium-containing cobalt oxides, lithium-containing nickel oxides or lithium-containing cobalt-nickel complex oxides are particularly preferred.

The active material of positive electrode in the organic electrolytic cell according to claim 4 of the present invention is not specifically limited, but there can be used lithium-containing metallic oxides (these lithium-containing metal oxides are capable of emitting lithium through electrochemical oxidation, namely charge, and is referred to as a first type of an active material of positive electrode) which can be represented by the general formula $LixMyOz$ (M is a metal, or can be two or more metals) such as $LixCoO_2$, $LixNio_2$, $LixMnO_2$ or $LixFeO_2$, or oxides and sulfides of transition metals such as cobalt, manganese, vanadium, titanium and nickel. The above electrically conductive polymers such as PAS can be suitably used. These active materials of positive electrode can be roughly classified into two kinds. That is, they are an active material of positive electrode (referred to as a first type of an active material of positive electrode in the present invention) capable of emitting lithium through electrochemical oxidation, namely charge, such as lithium-containing nickel oxides, lithium-containing cobalt-nickel double oxides and lithium-containing cobalt-nickel double oxides, and the other active material of positive electrode (referred to as a second type of an active material of positive electrode in the present invention). Particularly, when a high voltage is required, a lithium-containing oxide having a voltage of not less than 4 V vs lithium metal is preferred. Among them, lithium-containing cobalt oxides, lithium-containing nickel oxides or lithium-containing cobalt-nickel complex oxides are particularly preferred.

The positive electrode in the organic electrolytic cell of the present invention is one made by optionally adding an electrically conductive material and a binder to the above each active material and molding the mixture, and the kind and composition of the electrically conductive material and binder can be appropriately specified.

As the electrically conductive material, a powder of a metal such as metallic nickel can be used but carbon material such as active carbon, carbon black, acetylene black and graphite can be suitably used. A mixing ratio of these electrically conductive materials varies depending on the electric conductivity of the active material, shape of the electrode, etc., but it is suitable to add it in an amount of 2 to 40% based on the active material.

The binder may be any one which is insoluble in an electrolytic solution described hereinafter used in the organic electrolytic solution of the present invention. There can be preferably used, for example, rubber binders such as SBR, fluorine-containing resins such as polyethylene tetrafluoride and polyvinylidene fluoride, and thermoplastic resins such as polypropylene and polyethylene. The mixing ratio is preferably not more than 20% based on the above active material.

The current collector of positive electrode and current collector of negative electrode in the organic electrolytic cell of the present invention are respectively provided with pores piercing from the front surface to the back surface, and are made of materials such as nonwoven fabric, expanded metal, punched metal, net, foamed material or the like. The form and number of these through pores are not specifically limited and can be appropriately determined so that lithium ions in the electrolytic solution described hereinafter can transfer between the surface and back surfaces of the electrode without being interrupted by the current corrector of electrode. The porosity of the electrode current corrector is obtained by reducing a ratio of {1-(weight of current corrector)/(true specific gravity of current corrector)/(apparent volume of current corrector)} to percentage.

As the material of the electrode-current corrector, there can be used various materials which are generally proposed in lithium cells. Aluminum and stainless steel can be used as the current corrector of positive electrode, whereas, stainless steel, copper and nickel can be used as the current corrector of negative electrode. With respect to the current corrector of positive electrode, when lithium is directly attached as described hereinafter, it is preferred to use a material, which does not make an alloy with lithium and has resistance to electrochemical oxidation, such as stainless steel.

In the organic electrolytic cell according to claim 1 of the present invention, the total amount of lithium contained the cell is preferably not less than 500 mAh/g and the amount of lithium originating in the negative electrode is preferably not less than 100 mAh/g, based on the active material of negative electrode. The total amount of lithium contained the cell is the total of the amount of lithium originating in the positive electrode, that of lithium originating in the electrolytic solution and that of lithium originating in the negative electrode. Lithium originating in the positive electrode is lithium contained in the positive electrode on assembly of the cell, and a portion or all of lithium is supplied to the negative electrode through an operation of applying a current from an external circuit (charge). Lithium originating in the electrolytic solution in the organic electrolytic cell of the present invention is lithium in the electrolytic solution contained in the separator, positive electrode and negative electrode, whereas, lithium originating in the negative electrode is lithium carried on the active material of negative electrode and is lithium other than lithium originating in the positive electrode and lithium originating in electrolytic solution.

In the organic electrolytic cell according to claim 1 of the present invention, lithium originating in the negative electrode is carried on the negative electrode by electrochemical contact with lithium arranged to face the negative or positive electrode, thereby enabling all or a portion of lithium to permeate into at least one layer of the positive or negative electrode. As used herein, the term "lithium" refers to any material, which contains at least lithium and is capable of supplying lithium ions, such as lithium metal, lithium-aluminum alloy or the like.

In the organic electrolytic cell according to claim 1 of the present invention, in case the electrode adjacent to lithium arranged is a negative electrode, lithium is directly carried on the adjacent negative electrode, while lithium, which permeates into at least one layer of the positive electrode, is carried on the other negative electrode which is not adjacent to lithium. In case the electrode adjacent to lithium arranged is a positive electrode, all of lithium is carried on the negative electrode after it permeates into at least one layer of the positive electrode.

In the organic electrolytic cell according to claim 4 of the present invention, lithium originating in the positive electrode is lithium contained in the positive electrode and all or a portion of lithium is carried on the positive electrode by electrochemical contact with lithium arranged to face the negative or positive electrode. For example, when using $LiCoO_2$ as the active material of positive electrode, $LiCoO_2$ has already contained lithium on assembly of the cell, but lithium originating in the positive electrode is obtained by further adding lithium carried through electrochemical contact with lithium. On the other hand, when using $V_2O_5$ as the active material of positive electrode, since this material does not contain lithium, all of lithium originating in the positive electrode is carried by electrochemical contact with lithium. A portion or all of this lithium originating in the positive electrode is supplied to the negative electrode through an operation of applying a current from an external circuit (charge). Lithium originating in the electrolytic solution in the organic electrolytic cell of the present invention is lithium in the electrolytic solution contained in the separator, positive electrode and negative electrode, whereas, lithium originating in the negative electrode is lithium carried on the active material of negative electrode and is lithium other than lithium originating in the positive electrode and lithium originating in electrolytic solution.

In the organic electrolytic cell according to claim 4 of the present invention, all or a portion of lithium originating in the positive electrode is carried on the positive electrode by electrochemical contact with lithium arranged to face the negative or positive electrode, thereby enabling lithium to permeate into at least one layer of the positive or negative electrode.

The electrochemical contact between lithium and the positive electrode initiates when the electrolytic solution is poured into the cell system. When using the above first type of an active material of positive electrode, since said active material of positive electrode has already contained releasable lithium, it becomes possible to charge the cell system immediately after pouring the electrolytic solution into the cell system. Also when using the second type of an active material of positive electrode, it is possible to charge the cell system before all lithium is completely carried on the active material of positive electrode after pouring the electrolytic solution into the cell system. The above charge operation is effective to reduce the carrying time and to prevent the positive electrode from being in an over-discharge state, thereby preventing deterioration of the positive electrode due to the carrying operation of lithium.

In the organic electrolytic cell of the present invention, lithium originating in the negative or positive electrode is carried by electrochemical contact with lithium arranged to face the negative or positive electrode, thereby enabling all or a portion of lithium to permeate into at least one layer of the positive or negative electrode. As used herein, the term "lithium" refers to any material, which contains at least lithium and is capable of supplying lithium ions, such as lithium metal, lithium-aluminum alloy or the like.

In the organic electrolytic cell according to claim 1 of the present invention, lithium originating in the negative electrode is carried by electrochemical contact with lithium arranged to face the negative or positive electrode and an opposed area of lithium is not more than 40% of an area of the negative electrode. In the organic electrolytic cell according to claim 4 of the present invention, at least a portion of lithium originating in the negative electrode is carried by electrochemical contact with lithium arranged to face the negative or positive electrode and an opposed area of lithium is not more than 40% of an area of the positive electrode. As used herein, the term "lithium" refers to any material, which contains at least lithium and is capable of supplying lithium ions, such as lithium metal, lithium-aluminum alloy or the like.

BRIEF DESCRIPTION OF THE INVENTION

Figure 1:
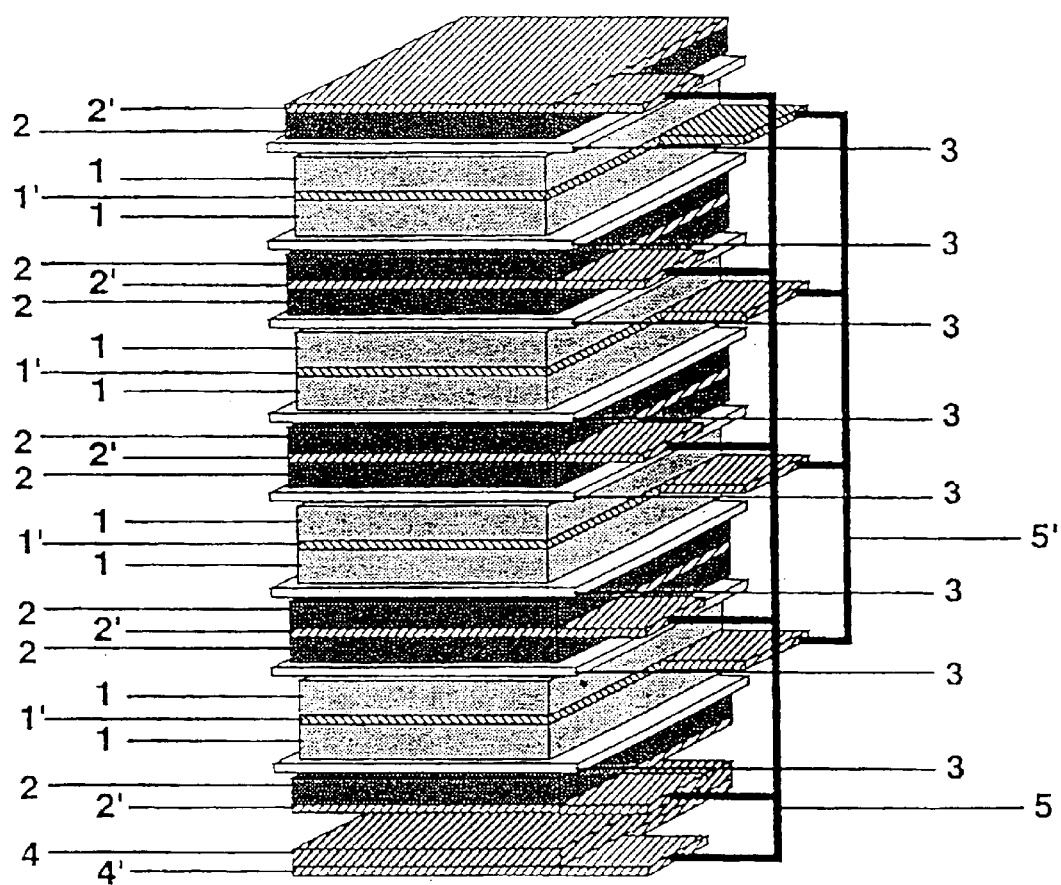
FIG. 1 is a view illustrating the arrangement of a first embodiment of electrodes in the cell according to the present invention.

With respect to reference numerals, 1 denotes a positive electrode, 2 denotes a negative electrode, 1' denotes a current collector (positive electrode), 2' denotes a current collector (negative electrode), 3 denotes a separator, 4 denotes a lithium metal, 4' denotes a current collector (lithium), 5 denotes a lead, and 5' denotes a lead, respectively.

BEST MODE FOR CARRYING OUT THE INVENTION

The embodiments of the present invention will be described below with reference to the accompanying drawings.

FIG. 1 to FIG. 6 respectively illustrate the embodiment of a cell of the type wherein plural pairs of positive electrode plates, a separator and a negative electrode plate are laminated in sequence in the organic electrolytic cell of the present invention.

FIG. 1 illustrates one embodiment of the arrangement of electrodes in a casing of the cell of the above type. As shown in this drawing, a negative electrode (2) molded on both surfaces of a current corrector (2') of negative electrode and a lithium metal (4) contact-bonded on a lithium metal current corrector (4') made of a stainless mesh or a copper expanded metal are connected through a lead (5) and the lithium metal (4) is arranged at the lower portion of a multi-layer unit. The current corrector (2') of negative electrode and lithium metal current corrector (4') can also be welded directly. A positive electrode (1) molded on both surfaces of a current corrector (1') of positive electrode and the above negative electrode (2) are laminated with each other via the separator (3). The separator (3) is made of a porous material, which is durable against the electrolytic solution or the electrode active material and which has open pores and is electrically non-conductive. There can be usually used a cloth, non-woven fabric or porous material made of glass fiber, polyethylene or polypropylene. To decrease the internal resistance of the cell, the separator (3) is preferably as thin as possible. Its thickness, however, is determined by appropriately considering the amount of electrolytic solution held, permeability, strength or the like. The separator (3) is impregnated with the electrolytic solution, and in the electrolytic solution, the compound capable of forming lithium ions with which doping is made is dissolved in an aprotic organic solvent. The electrolytic solution is usually a liquid and impregnated into the separator (3) but it can also be used, without any separator (3), after being made into gel or a solid for preventing leakage of the solution. The current corrector (2') of negative electrode and current corrector (1') of positive electrode are respectively provided with pores (not shown) piercing from the front surface to the back surface, and a terminal of negative electrode and a terminal of positive electrode of the cell are connected with them, respectively.

Figure 2:
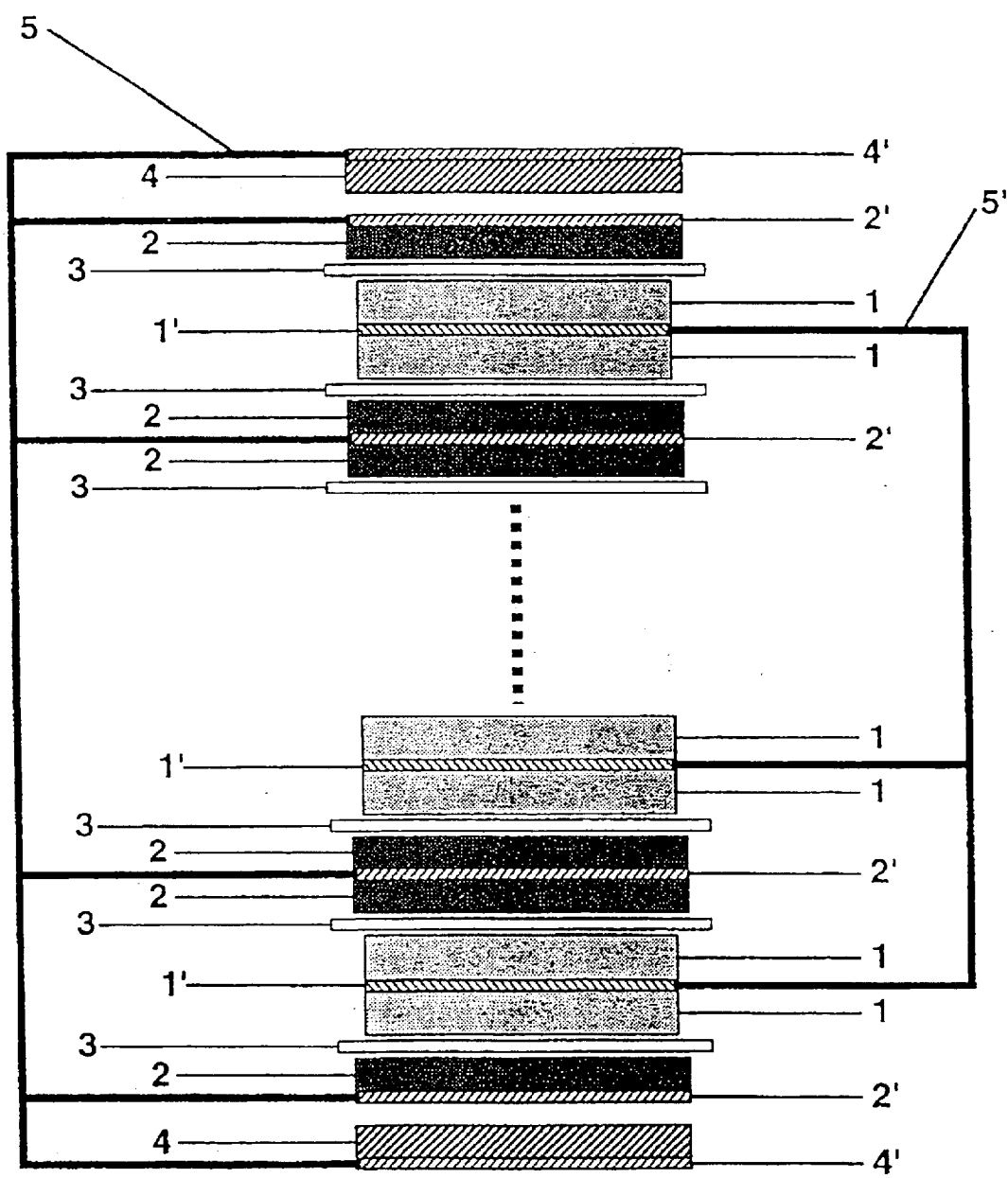
FIG. 2 is a view illustrating the arrangement of a second embodiment of electrodes in the cell according to the present invention.

FIG. 2 illustrates another embodiment of the arrangement of electrodes shown above. In this cell, the lithium metal (4) contact-bonded on the lithium metal current corrector (4') is arranged at the upper and lower portions of the multi-layer unit, respectively.

Figure 3:
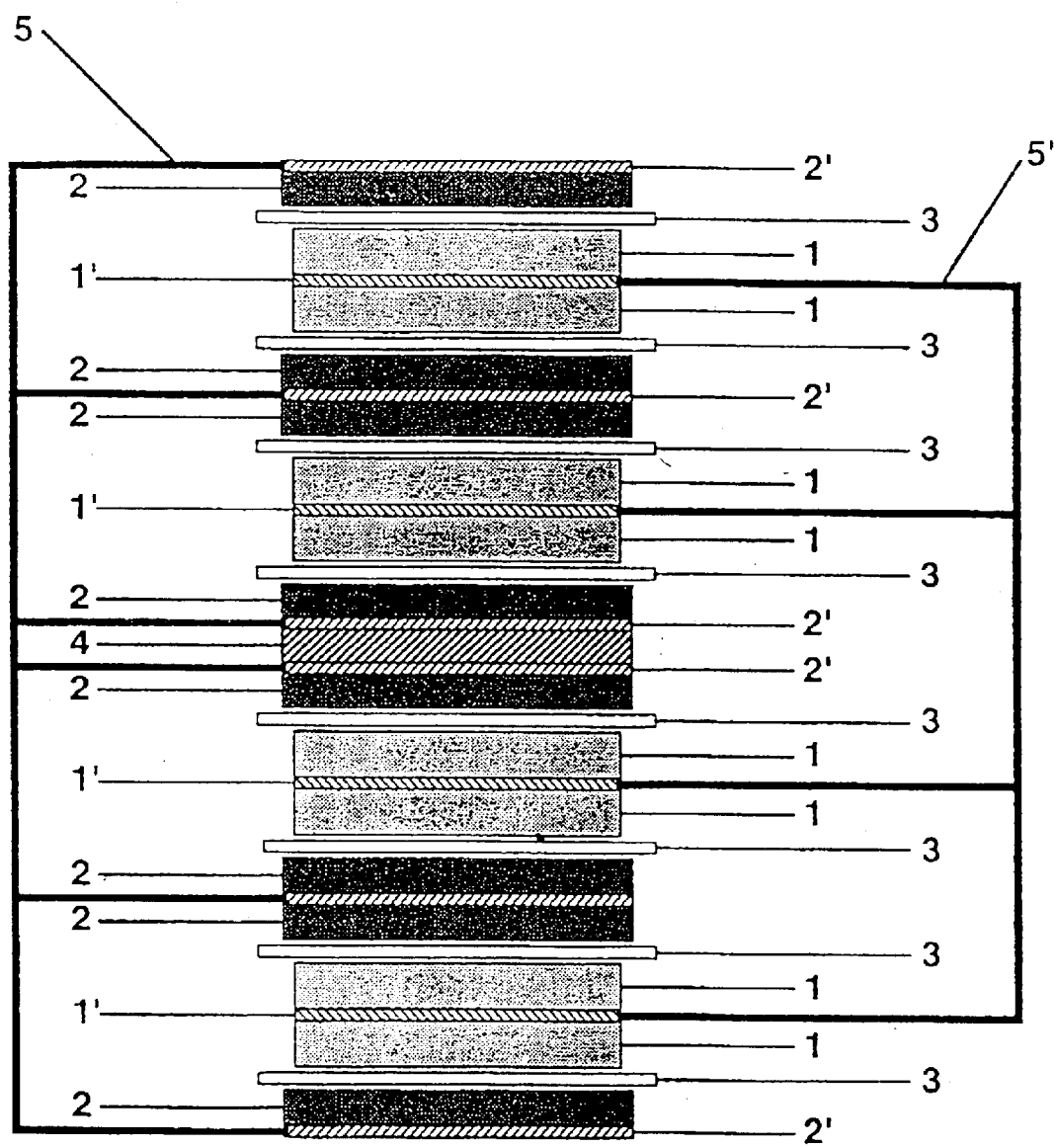
FIG. 3 is a view illustrating the arrangement of a third embodiment of electrodes in the cell according to the present invention.

Another modified embodiment shown in FIG. 3 illustrates that the lithium metal (4) is arranged in the center of the multi-layer unit.

Figure 4:
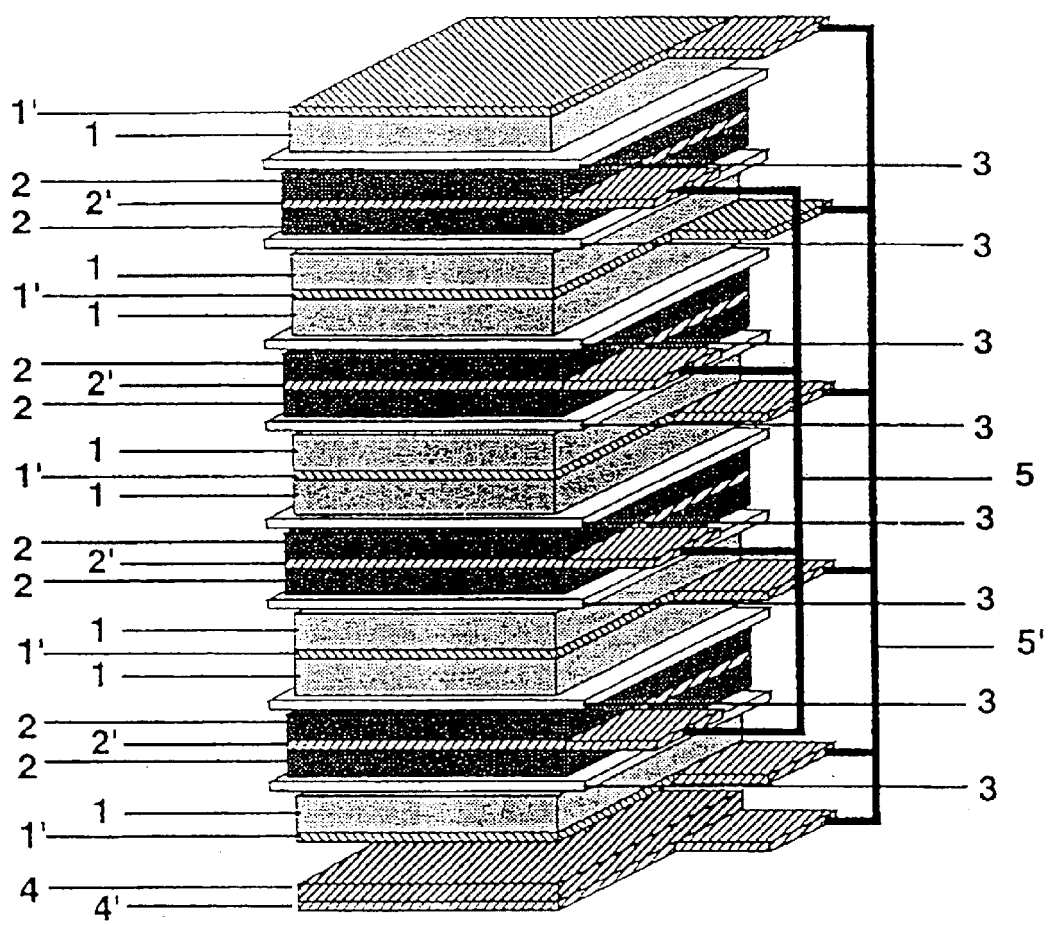
FIG. 4 is a view illustrating the arrangement of a fourth embodiment of electrodes in the cell according to the present invention.

FIG. 4 illustrates another embodiment of the arrangement of electrodes of the above type. In this embodiment, the positive electrode (1) molded on both surfaces of the current corrector (1') of positive electrode and the lithium metal (4) contact-bonded on the lithium metal current corrector (4') made of a stainless mesh or a copper expanded metal are connected through the lead (5) and the lithium metal (4) is arranged at the lower portion of the multi-layer unit. The above current corrector (1') of positive electrode and lithium metal current corrector (4') can also be welded directly. The negative electrode (2) molded on both surfaces of the current corrector (2') and the above positive electrode (1) are laminated via the separator (3).

Figure 5:
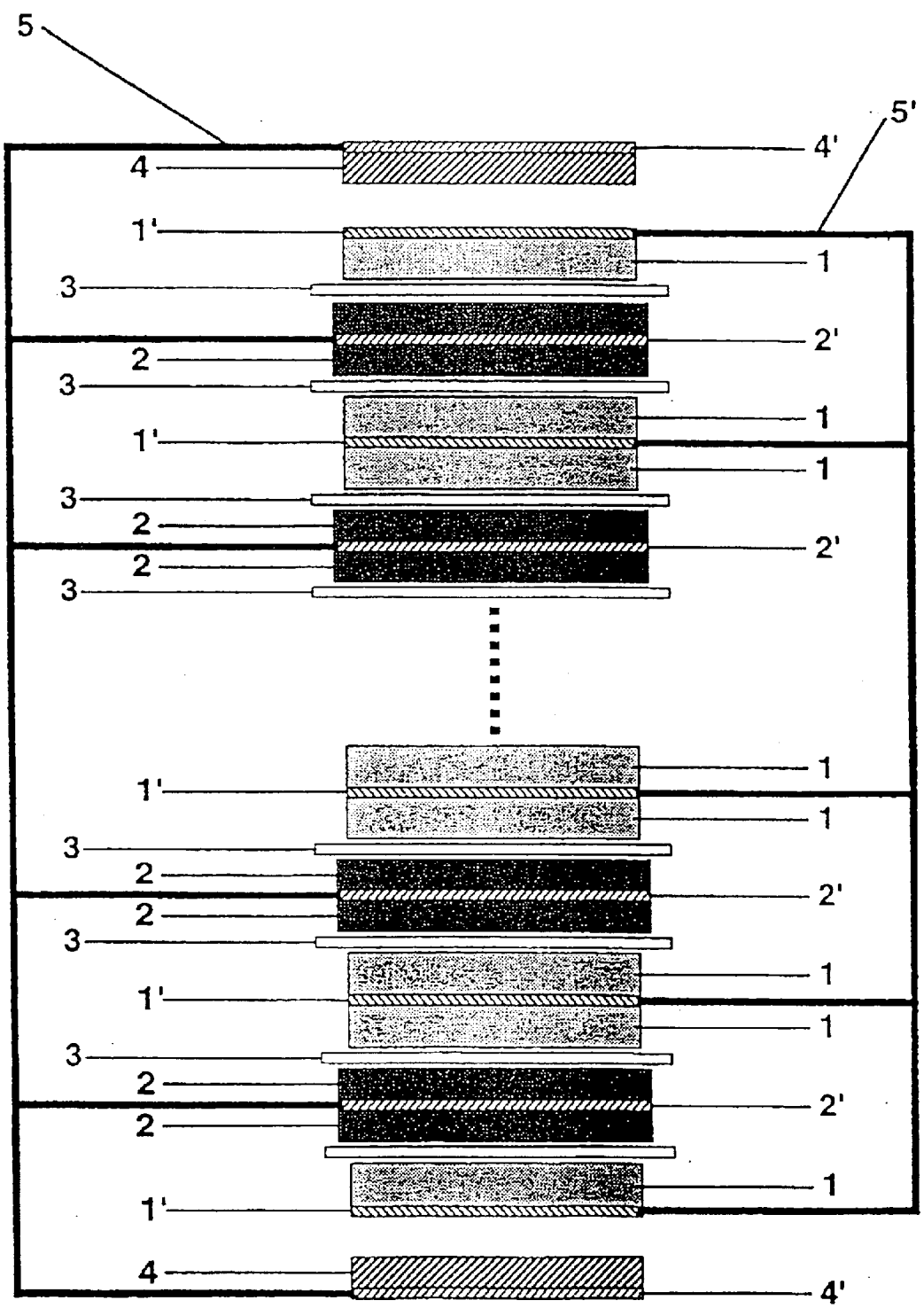
FIG. 5 is a view illustrating the arrangement of a fifth embodiment of electrodes in the cell according to the present invention.

FIG. 5 illustrates another embodiment of the arrangement of electrodes shown in FIG. 4. In this cell, the lithium metal (4) contact-bonded on the lithium metal current corrector (4') is arranged at the upper and lower portions of the multi-layer unit, respectively.

Figure 6:
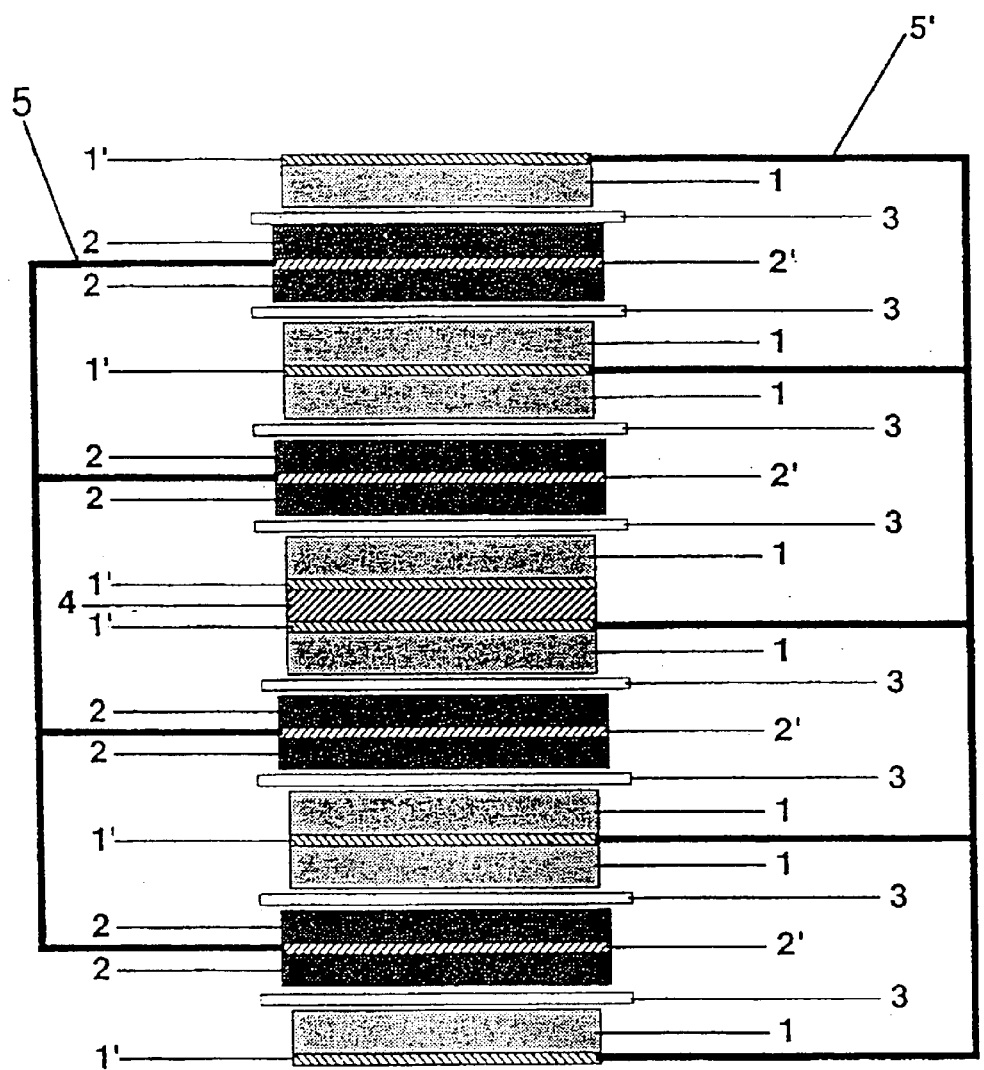
FIG. 6 is a view illustrating the arrangement of a sixth embodiment of electrodes in the cell according to the present invention.

Another modified embodiment shown in FIG. 6 illustrates that the lithium metal (4) is arranged in the center of the multi-layer unit. As mentioned above, in the arrangement of the electrodes of a multi-layer type cell, the position of the lithium metal (4) to be arranged can be appropriately changed as shown in the above embodiments.

Figure 7:
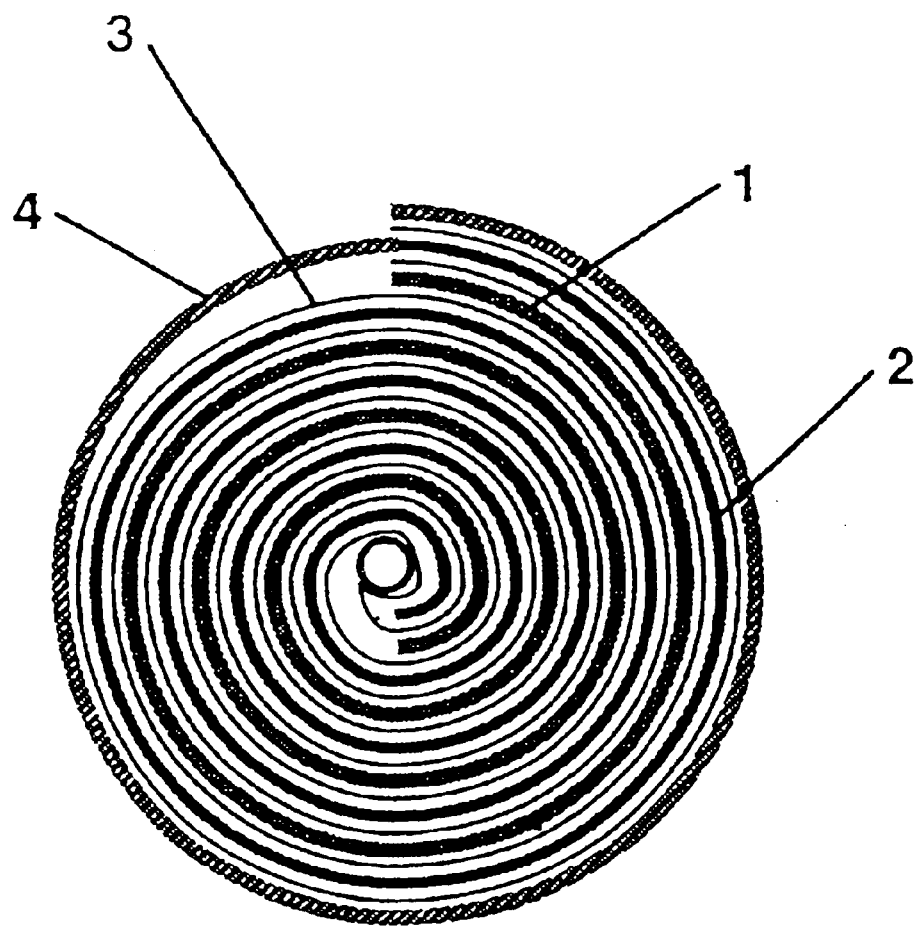
FIG. 7 is a view illustrating the arrangement of a seventh embodiment of electrodes in the cell according to the present invention.
Figure 8:
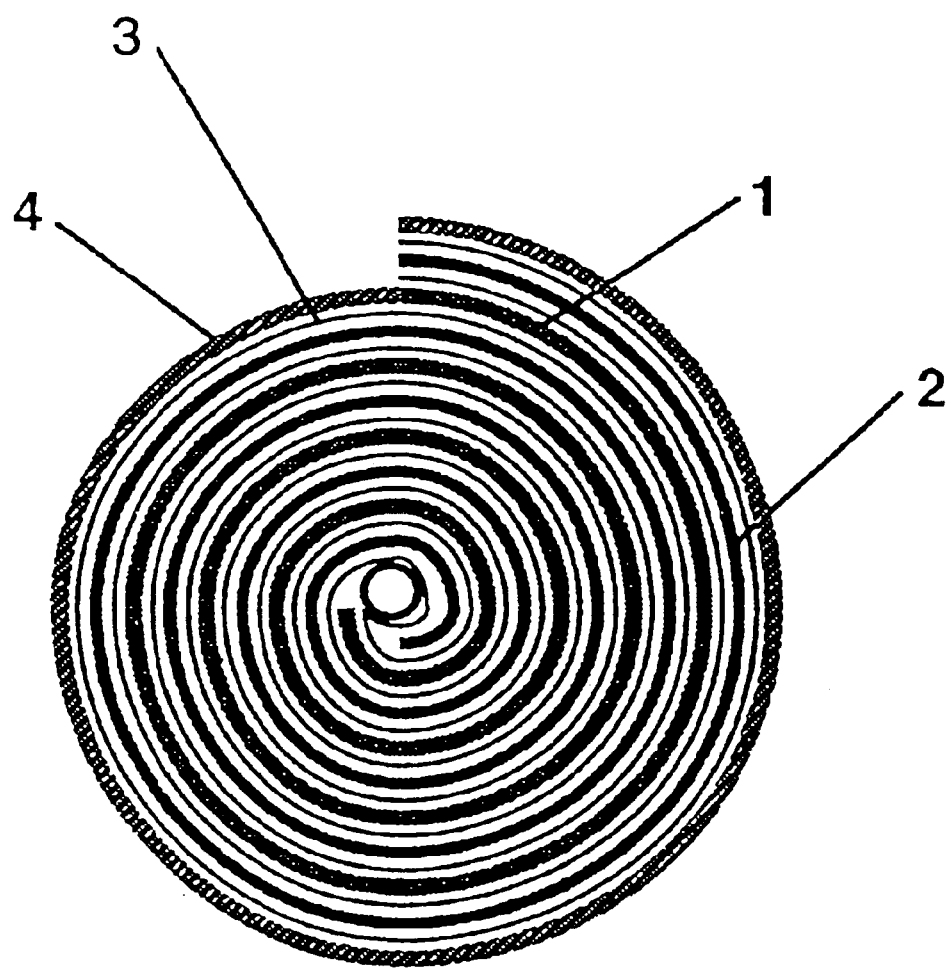
FIG. 8 is a view illustrating the arrangement of an eighth embodiment of electrodes in the cell according to the present invention.
Figure 9:
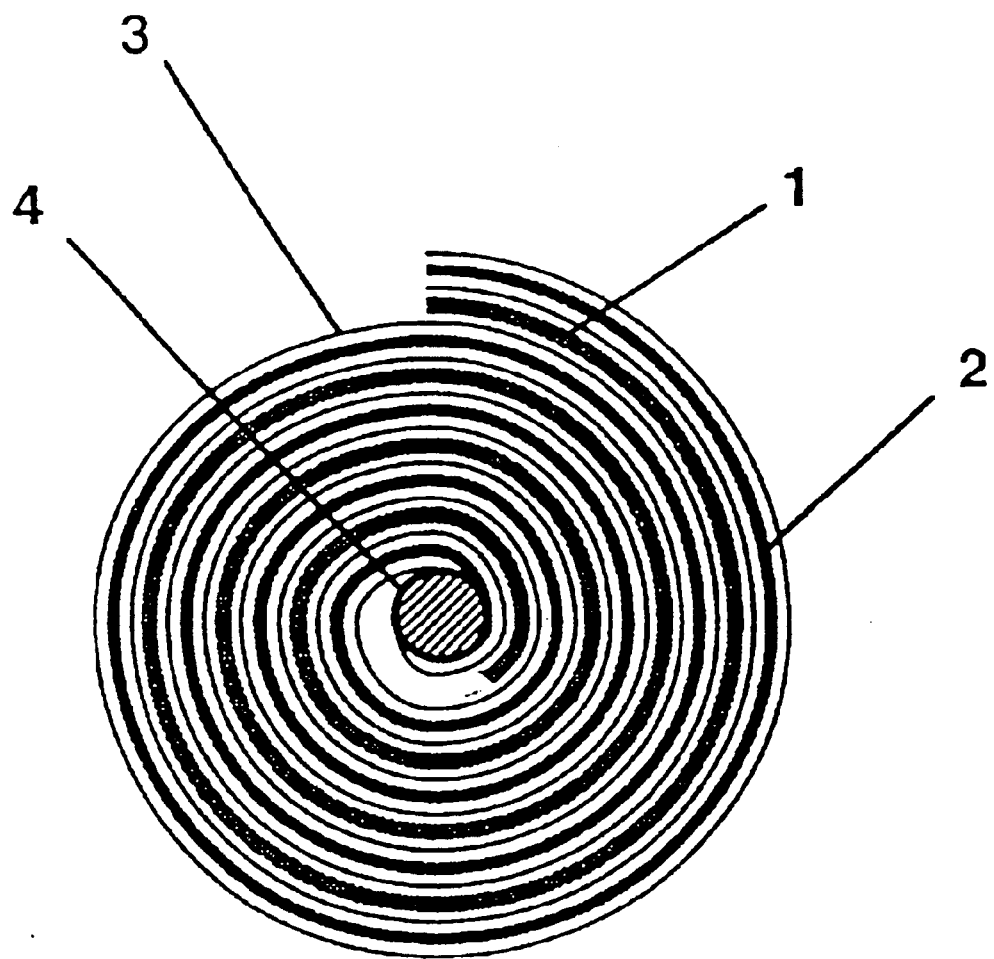
FIG. 9 is a view illustrating the arrangement of a ninth embodiment of electrodes in the cell according to the present invention.

FIG. 7 to FIG. 9 respectively illustrate the embodiment of the arrangement of electrodes of a cell having a wound-type structure used in a cylindrical cell as the embodiment of the present invention. FIG. 7 illustrates the embodiment wherein the lithium metal (4) is attached on the current corrector of an outer-most negative electrode (2) whereas, FIG. 8 illustrates the embodiment wherein the lithium metal (4) is attached on the current corrector of an outer-most positive electrode (1) (in the drawing, only the lithium metal (4) is shown at the portion where the lithium metal is laminated). FIG. 9 illustrates the embodiment wherein the lithium metal (4) having a columnar shape is arranged in the center of a wound-type structure.

Figure 10:
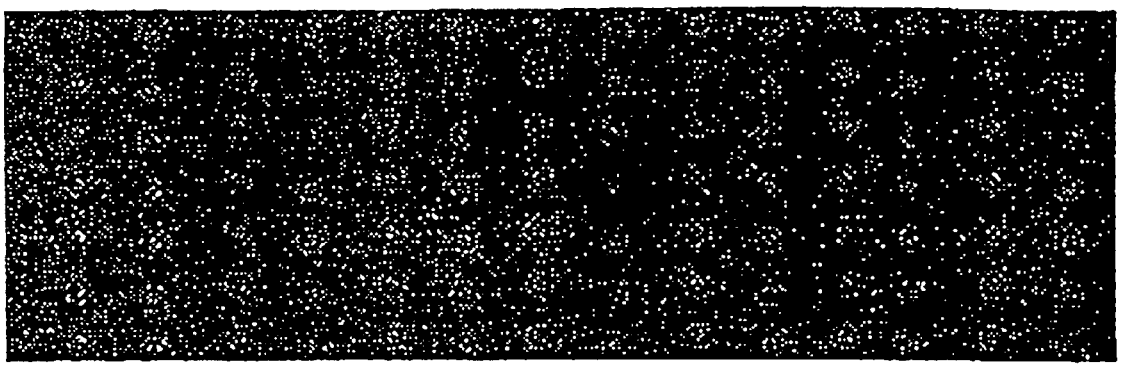
FIG. 10 is a view illustrating the arrangement of a tenth embodiment of electrodes in the cell according to the present invention.
Figure 10:
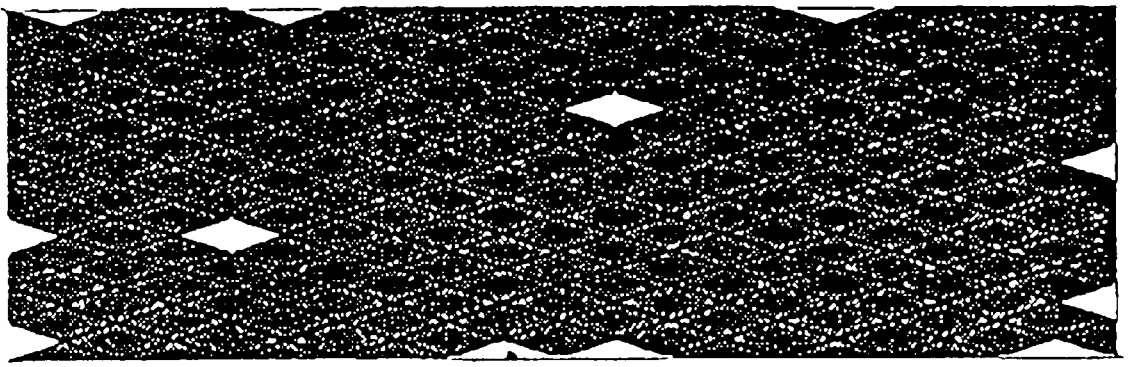

FIG. 10 illustrates an electrode using an expanded metal having a porosity of 80% and a punched metal having a porosity of 7%. With respect to the expanded metal, falling-off of an active material is recognized at the edge portion, especially. The falling-off of the active material can cause reduction of the capacity and short-circuit of the cell.

In the above embodiments, the negative or positive electrode is made contact with lithium via the conductor substance made of nickel, copper or stainless steel, or attaching lithium on the current corrector of negative electrode or the current corrector of positive electrode, but the organic electrolytic cell of the present invention is not specifically limited to this structure. For example, lithium may also be made contact by directly attaching it on the negative or positive electrode, or by directly attaching it on a negative electrode case or a positive electrode case. That is, it is necessary to arrange so that, when the electrolytic solution is poured on assembly of the cell, any of the negative or positive electrode is electrochemically made contact with lithium thereby to carry lithium on an active material of negative electrode or an active material of positive electrode via the electrolytic solution.

By filling the pore portion of an electrically conductive porous material such as stainless steel mesh as the lithium metal current corrector with 80% or more of lithium metal, a gap is hardly formed between electrodes by disappearance of lithium even if lithium is doped. Thus, lithium is smoothly carried on the active material of negative electrode or the active material of positive electrode.

To the contrary, there can also be proposed a method of arranging lithium in a transverse direction of the negative electrode plate or positive electrode plate and carrying lithium on the active material of negative electrode or active material of positive electrode by electrochemical contact between the negative or positive electrode and lithium in the cell. However, according to this method, it is impossible to avoid a problem that unevenness in doping in the cell increases and lithium is partially deposited on the negative electrode, resulting in long carrying time. Accordingly, in the present invention, it is not easy to use this method for mass production.

In the organic electrolytic cell of the present invention, by locally arranging lithium originating in the negative electrode or lithium originating in the positive electrode at a specific position, an opposed area of lithium is controlled to not more than 40% of an area of the negative or positive electrode, thereby making it possible to improve freedom of design of the cell and to provide the cell with excellent charge and discharge characteristics. As described above, the attachment of the lithium metal to almost all of the negative or positive electrode is very complicated and is not suited for industrial production, and also makes it impossible to perform mass production. In case the area of the lithium metal exceeds 40% of the area of the negative or positive electrode, there arise a problem that the thickness of the electrode is decided by that of the lithium metal, thereby making it impossible to obtain the desired charge and discharge characteristics.

In this cell, the amount of lithium originating in the negative electrode or lithium originating in the positive electrode can be appropriately determined by the desired cell, active material of negative electrode or active material of positive electrode, but a particularly high-capacity cell can be obtained by using PAS as the active material of negative electrode and satisfying the following conditions. That is, when using PAS as the active material of negative electrode, the total amount of lithium in the cell is preferably not less than 500 mAh/g, more preferably not less than 600 mAh/g, based on PAS of negative electrode so as to obtain a sufficient capacity.

In the organic electrolytic cell according to claim 1 of the present invention, the amount of lithium originating in the negative electrode is preferably not less than 100 mAh/g, more preferably not less than 150 mAh/g, based on PAS of negative electrode. When the amount of lithium originating in the negative electrode is less than 100 mAh/g even if the total amount of lithium is not less than 500 mAh/g based on PAS of negative electrode, there is some possibility of causing a problem that a sufficient capacity can not be obtained. When using a lithium-containing metal oxide as the positive electrode, a high capacity can be obtained by adjusting the amount of lithium originating in the negative electrode to 600 mAh/g or less based on PAS of negative electrode, which is preferred. Although the amount of lithium originating in the positive electrode and that of lithium originating in the electrolytic solution can be appropriately determined, the amount of lithium originating in the positive electrode is preferably not less than 300 mAh/g based on PAS of negative electrode so as to obtain a high capacity when using a lithium-containing metal oxide as the positive electrode.

In the organic electrolytic cell according to claim 4 of the present invention, when using the above first type of an active material of positive electrode, lithium originating in the positive electrode is preferably carried in the amount of not less than 100 mAh/g, more preferably not less than 150 mAh/g, based on PAS of negative electrode, in addition to lithium contained intrinsically in the positive electrode.

Using the same manner of the present invention, lithium originating in the negative electrode may be previously carried on PAS as the active material of negative electrode. Particularly, when using the above second type of an active material of positive electrode, since the amount of lithium to be carried increases, it is effective to separately carry a required amount of lithium on both the negative and positive electrode so as to reduce the carrying time.

As the solvent constituting the electrolytic solution used in the organic electrolytic solution of the present invention, an aprotic organic solvent is used. The aprotic organic solvent includes, for example, ethylene carbonate, propylene carbonate, dimethyl carbonate, diethyl carbonate, γ-butyrolactone, acetonitrile, dimethoxyethane, tetrahydrofuran, dioxolane, methylene chloride, sulfolane or the like. Furthermore, a mixed solution of two or more of these aprotic organic solvents can also be used.

Furthermore, as an electrolyte to be dissolved in the single or mixed solvent, any of electrolyte capable of forming lithium ions can be used. The electrolyte includes, for example, LiI, $LiClO_4$, $LiAsF_6$, $LiBF_4$, $LiPF_6$, $LiHF_2$ or the like.

The electrolyte and solvent are mixed in a state of being sufficiently dehydrated to give an electrolytic solution. To make the internal resistance by the electrolytic solution small, it is preferred to make the concentration of the electrolyte in the electrolytic solution at least 0.1 mol/l and it is more preferred to make it 0.2 to 1.5 mol/l.

The shape of the organic electrolytic cell according to the present invention includes, for example, cylindrical shape, rectangular shape and box shape, but is not specifically limited.

EXAMPLE 1

A phenol resin molding plate having a thickness of 0.5 mm was put in a silicon unit electric oven, and heat-treated by heating to 500° C. under a nitrogen atmosphere at a rate of 50° C./hour and then heating to 650° C. at a rate of 10° C./hour, thereby to synthesize PAS. The PAS plate thus obtained was ground by using a disc mill to obtain PAS powder having an average particle diameter of about 7 μm. The H/C ratio of this PAS powder was 0.22.

Then, 100 parts by weight of the PAS powder and 10 parts by weight of acetylene black were sufficiently mixed with a solution of 10 parts by weight of polyvinylidene fluoride powder in 120 parts by weight of N-methyl pyrrolidone to obtain slurry. The slurry was molded on both surfaces of a copper nonwoven fabric having a thickness of 25 μm (porosity: 28%) and then pressed to obtain a PAS negative electrode having a thickness of 200 μm. In addition, 100 parts by weight of $LiCoO_2$ and 5 parts by weight of graphite were sufficiently mixed with a solution of 3.5 parts by weight of polyvinylidene fluoride powder in 50 parts by weight of N-methyl pyrrolidone to obtain a slurry. The slurry was molded on both surfaces of an aluminum nonwoven fabric having a thickness of 35 μm (porosity: 20%) and then pressed to obtain a $LiCoO_2$ positive electrode having a thickness of 300 μm.

Using the positive electrode (2.0×3.0 cm$^2$) and PAS negative electrode (2.2×3.2 cm$^2$), each of which is obtained by cutting the above electrode into a predetermined size, and a polypropylene separator having a thickness of 25 μm, ten cells wherein the positive electrode, separator and negative electrode (nine positive electrodes) are laminated shown in FIG. 1 were assembled. As two outer negative electrodes, one having a thickness of 113 μm obtained by peeling off one of the above negative electrodes molded on both surfaces was used. As the lithium metal, one obtained by contact-bonding a lithium metallic foil (200 μm, 2.0×3.0 cm$^2$) on a stainless steel net having a thickness of 80 μm was used and was arranged to face the negative electrode. The negative electrodes (one surface×2, both surfaces×8) were respectively made contact with the stainless steel net, on which lithium was contact-bonded, through welding. The amount of the lithium metal was about 250 mAh/g based on the negative electrode PAS. As the electrolytic solution, a solution of $LiPF_6$ at a concentration of 1 mol/l in a 1:1 (weight ratio) mixed solution of ethylene carbonate and diethyl carbonate was used.Cells were allowed to stand at room temperature for four days, and then one of them decomposed. As a result, the lithium metal completely disappeared. The total amount of lithium contained in the cell was 1550 mAh/g based on the negative plate PAS. The negative electrodes (one surface×2, both surfaces×8) of the decomposed cell were removed and a beaker type cell was assembled using lithium as a counter electrode, and then a potential of each negative electrode was determined. As a result, any of the negative electrodes showed the potential within a range from 0.25 to 0.26 V and no unevenness in doping with lithium was recognized. lithium was recognized.

TABLE 1

| Negative electrode No. | Potential (V) |
| --- | --- |
| 1 (one surface) | 0.25 |
| 2 | 0.26 |
| 3 | 0.26 |
| 4 | 0.26 |
| 5 | 0.26 |
| 6 | 0.26 |
| 7 | 0.26 |
| 8 | 0.26 |
| 9 | 0.26 |
| 10 (one surface) | 0.26 |

Each of nine remainder cells was charged at a constant current of 150 mA until the cell voltage became 4.2 V and held at a contant voltage of 4.2 V for totally 12 hours. Subsequently, each of the above cells was discharged at a constant current of 70 mA until the cell voltage became 2.0 V. This 4.2 V–2.0 V cycle was repeated, and in the third discharge, the cell capacity was evaluated. As a result, it was 580 mAh (average of nine cells).

EXAMPLE 2

In the same manner as in Example 1, except that a copper expanded metal having a thickness of 60 μm (porosity: 70%) (manufactured by Thank Co., LW: 1 mm, SW: 0.5 mm) was used as the current collector of the negative electrode and an aluminum expanded metal having a thickness of 240 μm (porosity: 88%) (manufactured by Thank Co., LW: 2 mm, SW: 1 mm) was used as the current collector of the positive electrode, ten cells were assembled.

Cells were allowed to stand at room temperature for two days, and then one of them was decomposed. As a result, the lithium metal completely disappeared. After the negative electrodes were removed, a potential of each negative electrode was determined in the same manner as in Example 1. As a result, any of the negative electrodes showed the potential of 0.25 V and no unevenness in doping with lithium was recognized.

TABLE 2

| Negative electrode No. | Potential (V) |
| --- | --- |
| 11 (one surface) | 0.26 |
| 12 | 0.26 |
| 13 | 0.26 |
| 14 | 0.26 |
| 15 | 0.26 |
| 16 | 0.26 |
| 17 | 0.26 |
| 18 | 0.26 |
| 19 | 0.26 |
| 20 (one surface) | 0.26 |

Each of nine remainder cells was charged at a constant current of 150 mA until the cell voltage became 4.2 V and held at a constant voltage of 4.2 V for totally 12 hours. Subsequently, each of the above cells was discharged at a constant current of 70 mA until the cell voltage became 2.0 V. This 4.2 V–2.0 V cycle was repeated, and in the third discharge, the cell capacity was evaluated. As a result, it was 580 mAh (average of nine cells).

EXAMPLE 3

In the same manner as in Example 1, except that a copper punched metal having a thickness of 20 μm (porosity: 7%) was used as the current collector of the negative electrode and an aluminum punched metal having a thickness of 30 μm (porosity: 7%) was used as the current collector of the positive electrode, ten cells were assembled.

Cells were allowed to stand at room temperature for seven days, and then one of them was decomposed. As a result, the lithium metal completely disappeared. In the same manner as in Example 1, a potential of each of nine negative electrodes (one surface×2, both surfaces×8) was determined. As a result, any of the negative electrodes showed the potential within a range from 0.25 to 0.26 V (Table 3) and no unevenness in doping with lithium was recognized.

TABLE 3

| Negative electrode No. | Potential (V) |
| --- | --- |
| 21 (one surface) | 0.25 |
| 22 | 0.25 |
| 23 | 0.25 |
| 24 | 0.26 |
| 25 | 0.26 |
| 26 | 0.26 |
| 27 | 0.26 |
| 28 | 0.26 |
| 29 | 0.26 |
| 30 (one surface) | 0.26 |

Each of nine remainder cells was charged at a constant current of 150 mA until the cell voltage became 4.2 V and held at a constant voltage of 4.2 V for totally 12 hours.

Subsequently, each of the above cells was discharged at a constant current of 70 mA until the cell voltage became 2.0 V. This 4.2 V–2.0 V cycle was repeated, and in the third discharge, the cell capacity was evaluated. As a result, it was 580 mAh (average of nine cells).

EXAMPLE 4

Using the positive electrode, PAS negative electrode and separator, which are the same as those used in Example 1, ten cells wherein the positive electrode, separator and negative electrode (nine positive electrodes) are laminated shown in FIG. 4 were assembled. As two outer negative electrodes, one having a thickness of 168 μm obtained by peeling off one of the above negative electrodes molded on both surfaces was used. As the lithium metal, one obtained by contact-bonding a lithium metallic foil (200 μm, 2.0×3.0 cm$^2$) on a stainless steel net having a thickness of 80 μm was used and was arranged to face the positive electrode. The positive electrodes (one surface×2, both surfaces×8) were respectively made contact with the stainless steel net, on which lithium was contact-bonded, through welding. The amount of the lithium metal was about 250 mAh/g based on the negative electrode PAS. As the electrolytic solution, a solution of LIPF$_6$ at a concentration of 1 mol/l in a 1:1 (weight ratio) mixed solution of ethylene carbonate and diethyl carbonate was used. The total amount of lithium contained in the cell was 1550 mAh/g based on the negative plate PAS. Immediately after pouring the electrolytic solution, the cell was charged at a constant current of 150 mA for four hours. Cells were allowed to stand at room temperature for five days, and then one of them was decomposed. As a result, the lithium metal completely disappeared. The positive electrodes (one surface×2, both surfaces×8) of the decomposed cell were removed and a beaker type cell was assembled using lithium as a counter electrode, and then a potential of each positive electrode was determined. As a result, any of the positive electrodes showed the potential within of 3.89 V and no unevenness in doping with lithium was recognized (Table 4).

TABLE 4

| Positive electrode No. | Potential (V) |
|---|---|
| 1 (one surface) | 3.89 |
| 2 | 3.89 |
| 3 | 3.89 |
| 4 | 3.89 |
| 5 | 3.89 |
| 6 | 3.89 |
| 7 | 3.89 |
| 8 | 3.89 |
| 9 | 3.89 |
| 10 (one surface) | 3.89 |

Each of nine remainder cells was discharged at a constant current of 70 mA until the cell voltage became 2.0 V and charged at a constant current of 150 mA until the cell voltage became 4.2 V and held at a constant voltage of 4.2 V for totally 12 hours. Subsequently, each of the above cells was discharged at a constant current of 70 mA until the cell voltage became 2.0 V. This 4.2 V–2.0 V cycle was repeated, and in the third discharge, the cell capacity was evaluated. As a result, it was 580 mAh (average of nine cells).

EXAMPLE 5

In the same manner as in Example 4, except that a copper expanded metal having a thickness of 60 μm (porosity: 70%) (manufactured by Thank Co., LW: 1 mm, SW: 0.5 mm) was used as the current collector of the negative electrode and an aluminum expanded metal having a thickness of 240 μm (porosity: 88%) (manufactured by Thank Co., LW: 2 mm, SW: 1 mm) was used as the current collector of the positive electrode, ten cells were assembled. The total amount of lithium contained in the cell was 1550 mAh/g based on the negative plate PAS. Immediately after pouring the electrolytic solution, the cell was charged at a constant current of 150 mA for four hours. Cells were allowed to stand at room temperature for three days, and then one of them decomposed. As a result, the lithium metal completely disappeared. The positive electrodes (one surface×2, both surfaces×8) of the decomposed cell were removed and a beaker type cell was assembled using lithium as a counter electrode, and then a potential of each positive electrode was determined. As a result, any of the positive electrodes showed the potential of 3.89 V and no unevenness in doping with lithium was recognized (Table 5).

TABLE 5

| Positive electrode No. | Potential (V) |
|---|---|
| 11 (one surface) | 3.89 |
| 12 | 3.89 |
| 13 | 3.89 |
| 14 | 3.89 |
| 15 | 3.89 |
| 16 | 3.89 |
| 17 | 3.89 |
| 18 | 3.89 |
| 19 | 3.89 |
| 20 (one surface) | 3.89 |

Each of nine remainder cells was discharged at a constant current of 70 mA until the cell voltage became 2.0 V and charged at a constant current of 150 mA until the cell voltage became 4.2 V and held at a constant voltage of 4.2 V for totally 12 hours. Subsequently, each of the above cells was charged at a constant current of 70 mA until the cell voltage became 2.0 V. This 4.2 V–2.0 V cycle was repeated, and in the third discharge, the cell capacity was evaluated. As a result, it was 580 mAh (average of nine cells).

EXAMPLE 6

In the same manner as in Example 4, except that a copper punched metal having a thickness of 20 μm (porosity: 7%) was used as the current collector of the negative electrode and an aluminum punched metal having a thickness of 30 μm (porosity: 7%) was used as the current collector of the positive electrode, ten cells were assembled. The total amount of lithium contained in the cell was 1550 mAh/g based on the negative plate PAS. Immediately after pouring the electrolytic solution, the cell was charged at a constant current of 150 mA for four hours. Cells were allowed to stand at room temperature for seven days, and then one of them was decomposed. As a result, the lithium metal completely disappeared. The positive electrodes (one surface×2, both surfaces×8) of the decomposed cell were removed and a beaker type cell was assembled using lithium as a counter electrode, and then a potential of each positive electrode was determined. As a result, any of the positive electrodes showed the potential within a range from 3.88 to 3.89 V and no unevenness in doping with lithium was recognized (Table 6).

TABLE 6

| Positive electrode No. | Potential (V) |
|---|---|
| 21 (one surface) | 3.88 |
| 22 | 3.88 |
| 23 | 3.89 |
| 24 | 3.89 |
| 25 | 3.89 |
| 26 | 3.89 |
| 27 | 3.89 |
| 28 | 3.89 |
| 29 | 3.89 |
| 30 (one surface) | 3.89 |

Each of nine remainder cells was discharged at a constant current of 70 mA until the cell voltage became 2.0 V and charged at a constant current of 150 mA until the cell voltage became 4.2 V and held at a constant voltage of 4.2 V for totally 12 hours. Subsequently, each of the above cells was charged at a constant current of 70 mA until the cell voltage became 2.0 V. This 4.2 V–2.0 V cycle was repeated, and in the third discharge, the cell capacity was evaluated. As a result, it was 580 mAh (average of nine

EXAMPLE 1

In the same manner as in Example 1, except that an aluminum foil having a thickness of 30 μm was used as the current collector of the positive electrode, ten cells were assembled. Cells were allowed to stand at room temperature for twenty days, and then one of them was decomposed. As a result, almost all of the lithium metal was remained. In the same manner as in Example 1, a potential of each of nine negative electrodes (one surface×2, surfaces×8) was determined. As a result, only the negative electrodes adjacent to lithium showed the potential of 0.08 V, while other negative electrodes showed the potential within a range from 2.30 to 2.52 V (Table 7).

TABLE 7

| Negative electrode No. | Potential (V) |
|---|---|
| 31 (one surface) | 0.08 |
| 32 | 2.31 |
| 33 | 2.34 |
| 34 | 2.52 |
| 35 | 2.41 |
| 36 | 2.35 |
| 37 | 2.30 |
| 38 | 2.52 |
| 39 | 2.48 |
| 40 (one surface) | 2.45 |

Each of nine remainder cells was charged at a constant current of 150 mA until the cell voltage became 4.2 V and held at a constant voltage of 4.2 V for totally 12 hours. Subsequently, each of the above cells was discharged at a constant current of 70 mA until the cell voltage became 2.0 V. This 4.2 V–2.0 V cycle was repeated, and in the third discharge, the cell capacity was evaluated. As a result, it was 390 mAh (average of nine cells).

Comparative Example 2

In the same manner as in Example 1, except that a copper foil having a thickness of 18 μm was used as the current collector of the negative electrode, ten cells were assembled. Cells were allowed to stand at room temperature for twenty days, and then one of them was decomposed. As a result, almost all of the lithium metal was remained. In the same manner as in Example 1, a potential of each of nine negative electrodes (one surface×2, both surfaces×8) was determined. As a result, the negative electrodes showed the potential within a range from 2.71 to 2.91 V (Table 8).

TABLE 8

| Negative electrode No. | Potential (V) |
|---|---|
| 41 (one surface) | 2.85 |
| 42 | 2.82 |
| 43 | 2.71 |
| 44 | 2.88 |
| 45 | 2.91 |
| 46 | 2.77 |
| 47 | 2.86 |
| 48 | 2.83 |
| 49 | 2.83 |
| 50 (one surface) | 2.89 |

Each of nine remainder cells was charged at a constant current of 150 mA until the cell voltage became 4.2 V and held at a constant voltage of 4.2 V for totally 12 hours. Subsequently, each of the above cells was discharged at a constant current of 70 mA until the cell voltage became 2.0 V. This 4.2 V–2.0 V cycle was repeated, and in the third discharge, the cell capacity was evaluated. As a result, it was 390 mAh (average of nine cells).

EXAMPLE 3 in the same manner as in Example 4, except that an aluminum foil having a thickness of 30 μm was used as the current collector of the positive electrode and a copper foil having a thickness of 18 μm was used as the current collector of the negative electrode, ten cells were assembled. Immediately after assembling the cells, the cells were charged at a constant current of 150 mA for four hours. Cells were allowed to stand at room temperature for twenty days, and then one of them decomposed. As a result, almost all of the lithium metal was remained.

Each of nine remainder cells was discharged at a constant current of 70 mA until the cell voltage became 2.0 V and charged at a constant current of 150 mA until the cell voltage became 4.2 V and held at a constant voltage of 4.2 V for totally 12 hours. Subsequently, each of the above cells was discharged at a constant current of 70 mA until the cell voltage became 2.0 V. This 4.2 V–2.0 V cycle was repeated, and in the third discharge, the cell capacity was evaluated. As a result, it was 390 mAh (average of nine cells).

Comparative Example 4

In the same manner as in Example 4, except that an aluminum foil having a thickness of 30 μm was used as the current collector of the positive electrode, ten cells were assembled. Cells were allowed to stand at room temperature for twenty days, and then one of them was decomposed. As a result, almost all of the lithium metal was remained. Immediately after assembling the cells, the cells were charged at a constant current of 150 mA for four hours. One cell was allowed to stand at room temperature for twenty days, and then decomposed. As a result, almost all of the lithium metal was remained.

Each of nine remainder cells was discharged at a constant current of 70 mA until the cell voltage became 2.0 V and charged at a constant current of 150 mA until the cell voltage became 4.2 V and held at a constant voltage of 4.2 V for totally 12 hours. Subsequently, each of the above cells was discharged at a constant current of 70 mA until the cell voltage became 2.0 V. This 4.2 V–2.0 V cycle was repeated, and in the third discharge, the cell capacity was evaluated. As a result, it was 390 mAh (average of nine cells).

Comparative Example 5

In the same manner as in Example 1, a PAS negative electrode having a thickness of 290 μm and a LiCoO$_2$ positive electrode having a thickness of 440 μm were obtained. Using the positive electrode (2.0×3.0 cm$^2$), PAS negative electrode (2.2×3.2 cm$^2$) and a polypropylene separator having a thickness of 25 μm, ten cells wherein the positive electrode, separator and negative electrode (nine positive electrodes) are laminated were assembled. As two outer negative electrodes, one having a thickness of 158 μm obtained by peeling off one of the above negative electrodes molded on both surfaces was used. A lithium metallic foil (33 μm, 2.0×3.0 cm$^2$, 1.5×2.0 cm$^2$ with respect to two outer electrodes) as the lithium metal was laminated on the negative electrode. The amount of the lithium metal was about 250 mAh/g based on the negative electrode PAS. The total thickness of the electrodes, separator and lithium metal was almost the same as that in Example 1 and the electrolytic solution is also the same as that in Example 1. The total amount of lithium contained the cell was 1550 mAh/g based on the negative electrode PAS in the cell. Cells were allowed to stand at room temperature for four days, and then one of them was decomposed. As a result, the lithium metal completely disappeared. In the same manner as in Example 1, a potential of each of negative electrodes (one surface×2, both surfaces×5) was determined. As a result, any of the negative electrodes showed the potential of 26 V (Table 9) and no unevenness in doping with lithium was recognized.

TABLE 9

| Negative electrode No. | Potential (V) |
| --- | --- |
| 51 (one surface) | 0.26 |
| 52 | 0.26 |
| 53 | 0.26 |
| 54 | 0.26 |
| 55 | 0.26 |
| 56 | 0.26 |
| 57 | 0.26 |
| 58 | 0.26 |
| 59 | 0.26 |
| 60 (one surface) | 0.26 |

Each of nine remainder cells was charged at a constant current of 150 mA until the cell voltage became 4.2 V and held at a constant voltage of 4.2 V for totally 12 hours. Subsequently, each of the above cells was discharged at a constant current of 70 mA until the cell voltage became 2.0 V. This 4.2 V–2.0 V cycle was repeated, and in the third discharge, the cell capacity was evaluated. As a result, it was 520 mAh (average of nine cells).

It is a very complicated method, which is not suited for industrial production, to attach a lithium foil having a thickness of about 33 μm as a lower limit of the thickness for mass-production of lithium on each one negative electrode. In order to reduce the thickness of the electrode so as to improve the charge and discharge characteristics, a further thin lithium foil is required, whereby it becomes more difficult to conduct mass production.

Examples of a cylindrical cell will be described below.

EXAMPLE 7

In the same manner as in Example 1, a PAS negative electrode having a thickness of 210 μm and a LiCoO$_2$ positive electrode having a thickness of 300 μm were obtained. Using the positive electrode (5.4 cm in width×34.0 cm$^2$ in length), the PAS negative electrode (5.6 cm in width×36.0 cm$^2$ in length) and a polypropylene separator having a thickness of 25 μm, ten cylindrical cells were assembled. To contact-bond a lithium metallic foil, both surfaces of the negative electrode was provided with a portion (4.8 cm) made only of a current collector, on which no active material of negative electrode was formed (total length of the negative electrode is 36.0 cm+4.8 cm). One obtained by contact-bonding the lithium metallic foil (180 μm, 5.4×4.8 cm$^2$) on the current corrector of negative electrode was used and arranged to face the negative electrode and positive electrode as shown in FIG. 7, and then wound to obtain a wound-type cylindrical cell. The amount of the lithium metal was about 250 mAh/g based on the negative electrode PAS. As the electrolytic solution, a solution of LiPF$_6$ at a concentration of 1 mol/l in a 1:1 (weight ratio) mixed solution of ethylene carbonate and diethyl carbonate was used. The total amount of lithium contained in the cell was 1500 mAh/g based on the negative plate PAS. Cells were allowed to stand at room temperature for seven days, and then one of them was decomposed. As a result, the lithium metal completely disappeared.

Each of nine remainder cells was charged at a constant current of 400 mA until the cell voltage became 4.2 V and held at a constant voltage of 4.2 V for totally 12 hours. Subsequently, each of the above cells was discharged at a constant current of 200 mA until the cell voltage became 2.0 V. This 4.2 V–2.0 V cycle was repeated, and in the third discharge, the cell capacity was evaluated. As a result, it was 1900 mAh (average of nine cells).

EXAMPLE 8

In the same manner as in Example 7, the positive electrode, the PAS negative electrode and a separator, ten cylindrical cells (18650 type) were assembled. To contact-bond a lithium metallic foil, both surfaces of the positive electrode was provided with a portion (5.2 cm) made only of a current collector, on which no active material of positive electrode was formed(total length of the positive electrode is 34.0 cm+5.2 cm). One obtained by contact-bonding the lithium metallic foil (180 μm, 5.4×4.8 cm$^2$) on the current corrector of positive electrode was used and arranged to face the negative electrode and positive electrode as shown in FIG. 8, and then wound to obtain a wound-type cylindrical cell. The amount of the lithium metal was about 250 mAh/g based on the negative electrode PAS. As the electrolytic solution, a solution of LiPF$_6$ at a concentration of 1 mol/l in a 1:1 (weight ratio) mixed solution of ethylene carbonate and diethyl carbonate was used. The total amount of lithium contained in the cell was 1500 mAh/g based on the negative PAS electrode. Immediately after pouring the electrolytic solution, the cell was charged at a constant current of 500 mA for four hours. Cells were allowed to stand at room temperature for seven days, and then one of them was decomposed. As a result, the lithium metal completely disappeared.

Each of nine remainder cells was discharged at a constant current of 200 mA until the cell voltage became 2.0 V and charged at a constant current of 400 mA until the cell voltage became 4.2 V and held at a constant voltage of 4.2 V for totally 12 hours. Subsequently, each of the above cells was discharged at a constant current of 200 mA until the cell voltage became 2.0 V. This 4.2 V–2.0 V cycle was repeated, and in the third discharge, the cell capacity was evaluated. As a result, it was 1900 mAh (average of nine cells).

Comparative Example 5'

In the same manner as in Example 7, a PAS negative electrode having a thickness of 210 μm and a positive electrode having a thickness of 300 μm were obtained. Using the positive electrode (5.4 cm in width×34.5 cm² in length) PAS negative electrode (5.6 cm in width×36.5 cm² in length) and a polypropylene separator having a thickness of 25 μm, ten cells were assembled. Lithium was not arranged in the cell.

As the electrolytic solution, a solution of $LiPF_6$ at a concentration of 1 mol/l in a 1:1 (weight ratio) mixed solution of ethylene carbonate and diethyl carbonate was used. The total amount of lithium contained in the cell was 1500 mAh/g based on the negative PAS electrode.

Each of nine remainder cells was charged at a constant current of 400 mA until the cell voltage became 4.2 V and held at a constant voltage of 4.2 V for totally 12 hours. Subsequently, each of the above cells was discharged at a constant current of 200 mA until the cell voltage became 2.0 V. This 4.2 V–2.0 V cycle was repeated, and in the third discharge, the cell capacity was evaluated. As a result, it was 1300 mAh (average of nine cells).

As described above, in case the amount of lithium originating in the negative electrode is 0 mAh/g or lithium is not electrochemically carried previously, in addition to lithium contained intrinsically in the positive electrode, sufficient capacity was not obtained.

EXAMPLE 9

In the same manner as in Example 1, a PAS negative electrode having a thickness of 200 μm was obtained. Then, 100 parts by weight of $V_2O_5$ (second type of positive electrode) and 10 parts by weight of acetylene black were sufficiently mixed with a solution of 3.5 parts by weight of polyvinylidene fluoride powder in 80 parts by weight of N-methyl pyrrolidone to obtain a slurry. The slurry was molded on both surfaces of an aluminum punched metal having a thickness of 30 μm (porosity: 7%) and then pressed to obtain a positive electrode having a thickness of 580 μm.

Using the positive electrode (2.0×3.0 cm²), the PAS negative electrode (2.2×3.2 cm²) and a polypropylene separator having a thickness of 25 μm, ten cells wherein the positive electrode, separator and negative electrode (nine positive electrodes) are laminated shown in FIG. 1 were assembled. As two outer negative electrodes, one having a thickness of 304 μm obtained by peeling off one of the above negative electrodes molded on both surfaces was used. As the lithium metal, one obtained by contact-bonding a lithiummetallic foil (800 μm, 2.0×3.0 cm²) on a stainless steel net having a thickness of 80 μm was used and was arranged to face the positive electrode. The positive electrodes (one surface×2, both surfaces×8) were respectively made contact with the stainless steel net, on which lithium was contact-bonded, through welding. The opposed area (6 cm²) of lithium was 5.6% of the area of the positive electrode (6×18 (one surface×8, both surfaces×2)=108 cm²). The amount of the lithium metal was about 1000 mAh/g based on the negative electrode PAS. The electrolytic solution was the same as that used in Example 1. The total amount of lithium was 1050 mAh/g based on the negative electrode PAS in the cell. Cells were allowed to stand at room temperature for seven days, and then one of them was decomposed. As a result, the lithium metal completely disappeared.

Each of nine remainder cells was charged at a constant current of 150 mA until the cell voltage became 3.3 V and held at a constant voltage of 3.3 V for totally 12 hours. Subsequently, each of the above cells was discharged at a constant current of 70 mA until the cell voltage became 1.0 V. This 3.3 V–1.0 V cycle was repeated, and in the third discharge, the cell capacity was evaluated. As a result, it was 470 mAh (average of nine cells).

EXAMPLE 10

A phenol resin molding plate having a thickness of 0. 5 mm was put in a silicon unit electric oven, and heat-treated by heating to 500° C. under a nitrogen atmosphere at a rate of 50° C./hour and then heating to 650° C. at a rate of 10° C./hour, thereby to synthesize PAS. The PAS plate thus obtained was ground by using a disc mill to obtain PAS powder having an average particle diameter of about 7 μm. The H/C ratio of this PAS powder was 0.22.

Then, 100 parts by weight of the PAS powder and 10 parts by weight of acetylene black were sufficiently mixed with a solution of 10 parts by weight of polyvinylidene fluoride powder in 120 parts by weight of N-methyl pyrrolidone to obtain a slurry. The slurry was molded on both surfaces of a copper punched metal having a thickness of 20 μm (porosity: 7%) and then pressed to obtain a PAS negative electrode having a thickness of 520 μm.

In addition, 100 parts by weight of $LiCoO_2$ and 5 parts by weight of graphite were sufficiently mixed with a solution of 3.5 parts by weight of polyvinylidene fluoride powder in 50 parts by weight of N-methyl pyrrolidone to obtain a slurry. The slurry was molded on both surfaces of an aluminum punched metal having a thickness of 30 μm (porosity: 7%) and then pressed to obtain a $LiCoO_2$ positive electrode having a thickness of 780 μm.

In case ten (60 cm×150 cm) positive and negative electrodes were respectively made by way of trial, the elongation percentage and the presence or absence of falling-off were as shown in FIG. 10. As used herein, the term "elongation percentage" refers to a numerical value obtained by the expression: {(length of electrode after pressing—length of electrode before pressing) (length of electrode before pressing)}×100.

Both of the positive and negative electrodes showed a small elongation percentage and caused no falling-off, and the yield of the electrode was 100%.

TABLE 10

| Positive electrode No. | Elongation percentage (%) | Presence or absence of falling-off | Negative electrode No. | Elongation percentage (%) | Presence or absence of falling-off |
|---|---|---|---|---|---|
| 31 | 3.21 | No | 61 | 2.11 | No |
| 32 | 3.31 | No | 62 | 1.91 | No |
| 33 | 3.15 | No | 63 | 2.05 | No |
| 34 | 3.44 | No | 64 | 2.16 | No |
| 35 | 3.11 | No | 65 | 2.07 | No |
| 36 | 3.62 | No | 66 | 1.95 | No |
| 37 | 2.99 | No | 67 | 2.16 | No |
| 38 | 3.16 | No | 68 | 2.00 | No |
| 39 | 3.44 | No | 69 | 1.98 | No |
| 40 | 3.06 | No | 70 | 2.00 | No |

Using the positive electrode (2.0×3.0 cm²) and PAS negative electrode (2.2×3.2 cm²), each of which is obtained by cutting the above electrode into a predetermined size, and a polypropylene separator having a thickness of 25 μm, ten cells wherein the positive electrode, separator and negative electrode (four positive electrodes) are laminated shown in FIG. 1 were assembled. As two outer negative electrodes, one having a thickness of 270 μm obtained by peeling off one of the above negative electrodes molded on both surfaces was used.

As the lithium metal, one obtained by contact-bonding a lithium metallic foil (240 g m, 2.0×3.0 cm$^2$) on a stainless steel net having a thickness of 80 μm was used and was arranged to face the negative electrode. The negative electrodes (one surface×2, both surfaces×3) were respectively made contact with the stainless steel net, on which lithium was contact-bonded, through welding. The opposed area (6 cm$^2$) of lithium was 10.7% of the area of the positive electrode (7.04 cm$^{2\times8}$ (both surfaces×3, one surface×2)= 56.32 cm$^2$). The amount of the lithium metal was about 250 mAh/g based on the negative electrode PAS. As the electrolytic solution, a solution of LiPF$_6$ at a concentration of 1 mol/l in a 1:1 (weight ratio) mixed solution of ethylene carbonate and diethyl carbonate was used.

The total amount of lithium contained in the cell was 1550 mAh/g based on the negative PAS electrodes. Cells were allowed to stand at room temperature for seven days, and then one of them was decomposed. As a result, the lithium metal completely disappeared.

Each of nine remainder cells was charged at a constant current of 150 mA until the cell voltage became 4.2 V and held at a constant voltage of 4.2 V for totally 12 hours. Subsequently, each of the above cells was discharged at a constant current of 70 mA until the cell voltage became 2.0 V. This 4.2 V–2.0 V cycle was repeated, and in the third discharge, the cell capacity was evaluated. As a result, it was 720 mAh (average of nine cells). Any of nine cells did not cause short-circuit.

EXAMPLE 11

In the same manner as in Example 10, except that a copper punched metal having a thickness of 25 μm (porosity: 28%) was used as the current collector of the negative electrode and an aluminum punched metal having a thickness of 35 μm (porosity: 20%) was used as the current collector of the positive electrode, a PAS negative electrode having a thickness of 200 μm and a LiCoO$_2$ positive electrode having a thickness of 300 μm were obtained. In case ten (60 cm×150 cm) positive and negative electrodes were respectively made by way of trial, the elongation percentage and the presence or absence of falling-off were as shown in Table 11.

Both of the positive and negative electrodes showed a small elongation percentage and caused less falling-off, and the yield of both electrodes was 80%.

TABLE 11

| Positive electrode No. | Elongation percentage (%) | Presence or absence of falling-off | Negative electrode No. | Elongation percentage (%) | Presence or absence of falling-off |
|---|---|---|---|---|---|
| 44 | 5.82 | No | 71 | 3.86 | No |
| 42 | 5.80 | No | 72 | 3.80 | Yes |
| 43 | 5.77 | No | 73 | 3.75 | No |
| 44 | 6.01 | No | 74 | 3.62 | No |
| 45 | 5.78 | No | 75 | 3.35 | No |
| 46 | 6.05 | Yes | 76 | 3.80 | No |
| 47 | 5.93 | No | 77 | 3.92 | Yes |
| 48 | 5.93 | Yes | 78 | 3.93 | No |
| 49 | 5.88 | No | 79 | 3.55 | No |
| 50 | 5.78 | No | 80 | 3.62 | No |

Using the positive electrode (2.0×3.0 cm$^2$) and PAS negative electrode (2.2×3.2 cm$^2$), each of which is obtained by cutting the above electrode into a predetermined size, and a polypropylene separator having a thickness of 25 μm, ten cells wherein the positive electrode, separator and negative electrode (ten positive electrodes) are laminated shown in FIG. 1 were assembled. As two outer negative electrodes, one having a thickness of 113 μm obtained by peeling off one of the above negative electrodes molded on both surfaces was used. As the lithium metal, one obtained by contact-bonding a lithium metallic foil (200 μm, 2.0×3.0 cm$^2$) on a stainless steel net having a thickness of 80 μm was used and was arranged to face the negative electrode. The negative electrodes (one surface×2, both surfaces×3) were respectively made contact with the stainless steel net, on which lithium was contact-bonded, through welding. The area (6 cm$^2$) of lithium was 4.3% of the area of the positive electrode (7.04 cm$^2$×20 (both surfaces×9, b one surface×2)= 140.82 cm$^2$). The amount of the lithium metal was about 250 mAh/g based on the negative electrode PAS. The total thickness of the electrodes, separator and lithium metal was almost the same as that in Example 10 and the electrolytic solution was the same as that used in Example 10. The total amount of lithium contained in the cell was 1550 mAh/g based on the negative PAS electrode. Cells were allowed to stand at room temperature for five days, and then one of them was decomposed. As a result, the lithium metal completely disappeared.

Each of nine remainder cells was charged at a constant current of 150 mA until the cell voltage became 4.2 V and held at a constant voltage of 4.2 V for totally 12 hours. Subsequently, each of the above cells was discharged at a constant current of 70 mA until the cell voltage became 2.0 V. This 4.2 V–2.0 V cycle was repeated, and in the third discharge, the cell capacity was evaluated. As a result, it was 650 mAh (average of nine cells). Any of nine cells did not cause short-circuit.

EXAMPLE 12

In the same manner as in Example 11, a PAS negative electrode having a thickness of 200 μm and a LiCoO$_2$ positive electrode having a thickness of 300 μm were obtained. Using the positive electrode (2.0×3.0 cm$^2$), the PAS negative electrode (2.2×3.2 cm$^2$) and a polypropylene separator having a thickness of 25 μm, ten cells wherein the positive electrode, separator and negative electrode (ten positive electrodes) are laminated shown in FIG. 2 were assembled. As two outer negative electrodes, one having a thickness of 113 μm obtained by peeling off one of the above negative electrodes molded on both surfaces was used. As the lithium metal, one obtained by contact-bonding a lithium metallic foil (100 μm. 2.0×3.0 cm$^2$) on a stainless steel net having a thickness of 80 μm was used and two plates were arranged at the lower and upper portions of the electrode multi-layer unit thereby to face the negative electrode. The negative electrodes (one surface×2, both surfaces×9) were respectively made contact with the stainless steel net, on which lithium was contact-bonded, through welding. The area of lithium (6 cm$^{2\times2}$ (both surfaces×2)=12 cm$^2$) was 8.5% of the area of the negative electrode (7.04 cm$^{2\times18}$ (both surfaces×9, one surface×2)=140.82 cm$^2$) The amount of the lithium metal was about 250 mAh/g based on the negative electrode PAS. The total thickness of the electrodes, separator and lithium metal was almost the same as that in Example 10 and the electrolytic solution was the same as that used in Example 10. The total amount of lithium contained in the cell was 1550 mAh/g based on the negative plate PAS. Cells were allowed to stand at room temperature for five days, and then one of them was decomposed. As a result, the lithium metal completely disappeared.

Each of nine remainder cells was charged at a constant current of 150 mA until the cell voltage became 4.2 V and held at a constant voltage of 4.2 V for totally 12 hours. Subsequently, each of the above cells was discharged at a constant current of 70 mA until the cell voltage became 2.0 V. This 4.2 V–2.0 V cycle was repeated, and in the third discharge, the cell capacity was evaluated. As a result, it was 650 mAh (average of nine cells). Any of nine cells did not cause short-circuit.

EXAMPLE 13

Using the positive electrode (2.0×3.0 cm$^2$) and PAS negative electrode (2.2×3.2 cm$^2$), which are the same as those used in Example 10, and a polypropylene separator having a thickness of 25 μm, ten cells wherein the positive electrode, separator and negative electrode (four negative electrodes) are laminated shown in FIG. 4 were assembled. As two outer negative electrodes, one having a thickness of 412 μm obtained by peeling off one of the above negative electrodes molded on both surfaces was used. As the lithium metal, one obtained by contact-bonding a lithium metallic foil (240 μm, 2.0×3.0 cm$^2$) on a stainless steel net having a thickness of 80 μm was used and was arranged to face the positive electrode. The positive electrodes (one surface×2, both surfaces×3) were respectively made contact with the stainless steel net, on which lithium was contact-bonded, through welding. The opposed area(6 cm$^2$) of lithium was 12.5% of the area of the positive electrode (6×8 (both surfaces×3, one surface×2)=48 cm$^2$). The amount of the lithium metal was about 250 mAh/g based on the negative electrode PAS. As the electrolytic solution, a solution of LiPF$_6$ at a concentration of 1 mol/l in a 1:1 (weight ratio) mixed solution of ethylene carbonate and diethyl carbonate was used. The total amount of lithium contained in the cell was 1550 mAh/g based on the negative plate PAS. Immediately after pouring the electrolytic solution, the cell was charged at a constant current of 150 mA for four hours. Cells are allowed to stand at room temperature for 7 days, and then one of them was decomposed. As a result, the lithium metal completely disappeared.

Each of nine remainder cells was discharged at a constant current of 70 mA until the cell voltage became 2.0 V and charged at a constant current of 150 mA until the cell voltage became 4.2 V and held at a constant voltage of 4.2 V for totally 12 hours. Subsequently, each of the above cells was discharged at a constant current of 70 mA until the cell voltage became 2.0 V. This 4.2 V–2.0 V cycle was repeated, and in the third discharge, the cell capacity was evaluated. As a result, it was 720 mAh (average of nine cells). Any of nine cells did not cause short-circuit.

EXAMPLE 14

Using the positive electrode (2.0×3.0 cm$^2$) and PAS negative electrode (2.2×3.2 cm$^2$), which are the same as those used in Example 11, and a polypropylene separator having a thickness of 25 μm, ten cells wherein the positive electrode, separator and negative electrode (ten negative electrodes) are laminated shown in FIG. 4 were assembled. As two outer negative electrodes, one having a thickness of 168 μm obtained by peeling off one of the above negative electrodes molded on both surfaces was used. As the lithium metal, one obtained by contact-bonding a lithium metallic foil (200 μm, 2.0×3.0 cm$^2$) on a stainless steel net having a thickness of 80 μm was used and was arranged to face the positive electrode. The positive electrodes (one surface×2, both surfaces×9) were respectively made contact with the stainless steel net, on which lithium was contact-bonded, through welding. The opposed (6 cm$^2$) of lithium was 5.0% of the area of the positive electrode (6×20 (both surfaces×9, one surface×2)=120 cm$^2$). The amount of the lithium metal was about 250 mAh/g based on the negative electrode PAS. The total thickness of the electrodes, separator and lithium metal was almost the same as that in Example 10 and the electrolytic solution was the same as that used in Example 10. The total amount of lithium contained in the cell was 1550 mAh/g based on the negative PAS electrodes. Immediately after pouring the electrolytic solution, the cell was charged at a constant current of 150 mA for four hours. Cells are allowed to stand at room temperature for 5 days, and then one of them was decomposed. As a result, the lithium metal completely disappeared.

Each of nine remainder cells was discharged at a constant current of 70 mA until the cell voltage became 2.0 V and charged at a constant current of 150 mA until the cell voltage became 4.2 V and held at a constant voltage of 4.2 V for totally 12 hours. Subsequently, each of the above cells was discharged at a constant current of 70 mA until the cell voltage became 2.0 V. This 4.2 V–2.0 V cycle was repeated, and in the third discharge, the cell capacity was evaluated. As a result, it was 650 mAh (average of nine cells). Any of nine cells did not cause short-circuit.

EXAMPLE 15

Using the positive electrode (2.0×3.0 cm$^2$) and PAS negative electrode (2.2×3.2 cm$^2$), which are the same as those used in Example 12, and a polypropylene separator having a thickness of 25 μm, ten cells wherein the positive electrode, separator and negative electrode (nine negative electrodes) are laminated shown in FIG. 5 were assembled. As two outer negative electrodes, one having a thickness of 168 μm obtained by peeling off one of the above negative electrodes molded on both surfaces was used. As the lithium metal, one obtained by contact-bonding a lithium metallic foil (100 μm, 2.0×3.0 cm$^2$) on a stainless steel net having a thickness of 80 μm was used and was arranged to face the positive electrode. The positive electrodes (one surface×2, both surfaces×8) were respectively made contact with the stainless steel net, on which lithium was contact-bonded, through welding. The opposed area (6 cm$^2$×2 (both surfaces×2)=12 cm$^2$) of lithium was 11.1% of the area of the negative electrode (6×18 (both surfaces×8, one surface×2)= 108 cm$^2$). The amount of the lithium metal was about 250 mAh/g based on the negative electrode PAS. The total thickness of the electrodes, separator and lithium metal was almost the same as that in Example 10 and the electrolytic solution was the same as that used in Example 10. The total amount of lithium contained in the cell was 1550 mAh/g based on the negative PAS electrodes. Immediately after pouring the electrolytic solution, the cell was charged at a constant current of 150 mA for four hours. Cells are allowed to stand at room temperature for 5 days, and then one of them was decomposed. As a result, the lithium metal completely disappeared.

Each of nine remainder cells was discharged at a constant current of 70 mA until the cell voltage became 2.0 V and charged at a constant current of 150 mA until the cell voltage became 4.2 V and held at a constant voltage of 4.2 V for totally 12 hours. Subsequently, each of the above cells was discharged at a constant current of 70 mA until the cell voltage became 2.0 V. This 4.2 V–2.0 V cycle was repeated, and in the third discharge, the cell capacity was evaluated. As a result, it was 650 mAh (average of nine cells). Any of nine cells did not cause short-circuit.

Comparative Example 6

In the same manner as in Example 10, except that a copper expanded metal having a thickness of 60 μm (porosity: 70%) (manufactured by Thank Co., LW: 1 mm, SW: 0.5 mm) was used as the current collector of the negative electrode and an aluminum expanded metal having a thickness of 240 μm (porosity: 88%) (manufactured by THANK Co., LW: 2 mm, SW: 1 mm) was used as the current collector of the positive electrode, ten cells were assembled. In case ten positive and negative electrodes (60 cm×150 cm) were respectively made by way of trial, the elongation percentage and presence or absence of falling-off were as shown in Table 12. The strength was small because of large elongation percentage, and severe falling-off of the active material occurred. The yield of the positive electrode was 50%, while the yield of the negative electrode was 60%.

Cells were allowed to stand at room temperature for two days, and then one of them decomposed. As a result, the lithium metal completely disappeared.

Each of nine remainder cells was charged at a constant current of 150 mA until the cell voltage became 4.2 V and held at a constant voltage of 4.2 V for totally 12 hours. At this time, three cells caused short-circuit. Subsequently, each of the above cells was discharged at a constant current of 70 mA until the cell voltage became 2.0 V. This 4.2 V–2.0 V cycle was repeated, and in the third discharge, the cell capacity was evaluated. As a result, it was 710 mAh (average of six cells).

TABLE 12

| Positive electrode No. | Elongation percentage (%) | Presence or absence of falling-off | Negative electrode No. | Elongation percentage (%) | Presence or absence of falling-off |
|---|---|---|---|---|---|
| 51 | 19.0 | Yes | 81 | 11.2 | No |
| 52 | 19.9 | Yes | 82 | 12.9 | No |
| 53 | 19.5 | No | 83 | 14.3 | Yes |
| 54 | 20.6 | Yes | 84 | 14.3 | No |
| 55 | 20.8 | No | 85 | 15.1 | Yes |
| 56 | 18.4 | No | 86 | 16.1 | Yes |
| 57 | 20.6 | Yes | 87 | 13.7 | No |
| 58 | 21.6 | Yes | 88 | 14.3 | Yes |
| 59 | 19.5 | No | 89 | 15.4 | No |
| 60 | 18.3 | No | 90 | 15.0 | No |

Comparative Example 7

In the same manner as in Example 11, except that a copper expanded metal having a thickness of 30 μm (porosity: 40%) was used as the current collector of the negative electrode and an aluminum expanded metal having a thickness of 45 μm (porosity: 35%) was used as the current collector of the positive electrode, ten cells were assembled. In case ten positive and negative electrodes (60 cm×150 cm) were respectively made by way of trial, the elongation percentage and presence or absence of falling-off were as shown in Table 13. The strength was small because of large elongation percentage, and severe falling-off of the active material occurred. The yield of the positive electrode was 60%, while the yield of the negative electrode was 70%.

Cells were allowed to stand at room temperature for five days, and then one of them was decomposed. As a result, the lithium metal completely disappeared.

Each of nine remainder cells was charged at a constant current of 150 mA until the cell voltage became 4.2 V, and then constant current/constant voltage charge of applying a constant voltage of 4.2 V was conducted for 12 hours. At his time, one cell caused short-circuit. Subsequently, each of the above cells was discharged at a constant current of 70 mA until the cell voltage became 2.0 V. This 4.2 V–2.0 V cycle was repeated, and in the third discharge, the cell capacity was evaluated. As a result, it was 640 mAh (average of eight cells).

TABLE 13

| Positive electrode No. | Elongation percentage (%) | Presence or absence of falling-off | Negative electrode No. | Elongation percentage (%) | Presence or absence of falling-off |
|---|---|---|---|---|---|
| 61 | 10.2 | Yes | 91 | 6.89 | Yes |
| 62 | 9.89 | No | 92 | 6.35 | No |
| 63 | 9.23 | No | 93 | 6.52 | Yes |
| 64 | 10.3 | Yes | 94 | 6.50 | No |
| 65 | 9.56 | No | 95 | 5.89 | No |
| 66 | 9.68 | No | 96 | 5.88 | No |
| 67 | 8.99 | No | 97 | 6.13 | No |
| 68 | 10.2 | Yes | 98 | 5.55 | No |
| 69 | 9.78 | Yes | 99 | 6.23 | Yes |
| 70 | 9.23 | No | 100 | 6.00 | No |

Comparative Example 8

In the same manner as in Example 10, except that an aluminum foil having a thickness of 30 μm was used as the current collector of the positive electrode, ten cells were assembled. Cells were allowed to stand at room temperature for twenty days, and then one of them was decomposed. As a result, almost all of lithium metal was remained.

Each of nine remainder cells was charged at a constant current of 150 mA until the cell voltage became 4.2 V and held at a constant voltage of 4.2 V for totally 12 hours. Subsequently, each of the above cells was discharged at a constant current of 70 mA until the cell voltage became 2.0 V. This 4.2 V–2.0 V cycle was repeated, and in the third discharge, the cell capacity was evaluated. As a result, it was 450 mAh (average of nine cells). Any of nine cells did not cause short-circuit.

Comparative Example 9

In the same manner as in Example 10, except that a copper foil having a thickness of 18 μm was used as the current collector of the negative electrode, ten cells were assembled. Cells were allowed to stand at room temperature for twenty days, and then one of them was decomposed. As a result, almost all of lithium metal was remained.

Each of nine remainder cells was charged at a constant current of 150 mA until the cell voltage became 4.2 V, and then constant current/constant voltage charge of applying a constant voltage of 4.2 V was conducted for 12 hours. Subsequently, each of the above cells was discharged at a constant current of 70 mA until the cell voltage became 2.0 V. This 4.2 V–2.0 V cycle was repeated, and in the third discharge, the cell capacity was evaluated. As a result, it was 450 mAh (average of nine cells). Any of nine cells did not cause short-circuit.

Comparative Example 10

In the same manner as in Example 10, a PAS negative electrode having a thickness of 290 μm and a PAS positive electrode having a thickness of 438 μm were obtained. Using the positive electrode (2.0×3.0 cm$^2$), PAS negative electrode (2.2×3.2 cm$^2$) and a polypropylene separator having a thickness of 25 μm, ten cells wherein the positive electrode, separator and negative electrode (seven positive electrodes) are laminated were assembled.

As two outer negative electrodes, one having a thickness of 175 μm obtained by peeling off one of the above negative electrodes molded on both surfaces was used. A lithium metallic foil (33 μm, 2.0×3.0 cm², 1.5×2.0 cm² with respect to two outer electrodes) as the lithium metal was laminated on the negative electrode. The area (6 cm²×6+3 cm²×2)=42 cm²) of lithium was 42.6% of the area of the negative electrode (7.04 cm²×14 (both surface×6, one surface×2)= 98.56 cm²). The amount of the lithium metal was about 250 mAh/g based on the negative electrode PAS. The total thickness of the electrodes, separator and lithium metal was almost the same as that in Example 10 and the electrolytic solution is also the same as that in Example 10. The total amount of lithium contained the cell was 1550 mAh/g based on the negative electrode PAS in the cell. Cells were allowed to stand at room temperature for seven days, and then one of them decomposed. As a result, the lithium metal completely disappeared.

Each of nine remainder cells was charged at a constant current of 150 mA until the cell voltage became 4.2 V and held at a constant voltage of 4.2 V for totally 12 hours. Subsequently, each of the above cells was discharged at a constant current of 70 mA until the cell voltage became 2.0 V. This 4.2 V–2.0 V cycle was repeated, and in the third discharge, the cell capacity was evaluated. As a result, it was 680 mAh (average of nine cells). Any of nine cells did not cause short-circuit.

Comparative Example 11

Using the same electrodes as those used in Comparative Example 6, ten cells were assembled in the same manner as in Example 13. Cells were allowed to stand at room temperature for two days, and then one of them was decomposed. As a result, the lithium metal completely disappeared.

Each of nine remainder cells was discharged at a constant current of 70 mA until the cell voltage became 2.0 V and charged at a constant current of 150 mA until the cell voltage became 4.2 V and held at a constant voltage of 4.2 V for totally 12 hours. At this time, three cells caused short-circuit. Subsequently, each of the above cells was discharged at a constant current of 70 mA until the cell voltage became 2.0 V. This 4.2 V–2.0 V cycle was repeated, and in the third discharge, the cell capacity was evaluated. As a result, it was 710 mAh (average of six cells).

Comparative Example 12

Using the same electrodes as those used in Comparative Example 7, ten cells were assembled in the same manner as in Example 14. Cells were allowed to stand at room temperature for two days, and then one of them was decomposed. As a result, the lithium metal completely disappeared.

Each of nine remainder cells was discharged at a constant current of 70 mA until the cell voltage became 2.0 V and charged at a constant current of 150 mA until the cell voltage became 4.2 V and held at a constant voltage of 4.2 V for totally 12 hours. At this time, one cell caused short-circuit. Subsequently, each of the above cells was discharged at a constant current of 70 mA until the cell voltage became 2.0 V. This 4.2 V–2.0 V cycle was repeated, and in the third discharge, the cell capacity was evaluated. As a result, it was 640 mAh (average of eight cells).

Comparative Example 13

In the same manner as in Example 13, except that an aluminum foil having a thickness of 30 μm was used as the current collector of the positive electrode and a copper foil having a thickness of 18 μm was used as the current collector of the negative electrode, ten cells were assembled. Cell S were allowed to stand at room temperature for twenty days, and then one of them was decomposed. As a result, almost all of the lithium metal was remained.

Each of nine remainder cells was discharged at a constant current of 70 mA until the cell voltage became 2.0 V and charged at a constant current of 150 mA until the cell voltage became 4.2 V and held at a constant voltage of 4.2 V for totally 12 hours. Subsequently, each of the above cells was discharged at a constant current of 70 mA until the cell voltage became 2.0 V. This 4.2 V–2.0 V cycle was repeated, and in the third discharge, the cell capacity was evaluated. As a result, it was 450 mAh (average of nine cells). Any of nine cells did not cause short-circuit.

Comparative Example 14

In the same manner as in Example 13, except that an aluminum foil having a thickness of 30 μm was used as the current collector of the positive electrode, ten cells were assembled. Cells were allowed to stand at room temperature for twenty days, and then one of them was decomposed. As a result, almost all of the lithium metal was remained.

Each of nine remainder cells was discharged at a constant current of 70 mA until the cell voltage became 2.0 V and charged at a constant current of 150 mA until the cell voltage became 4.2 V and held at a constant voltage of 4.2 V for totally 12 hours. Subsequently, each of the above cells was discharged at a constant current of 70 mA until the cell voltage became 2.0 V. This 4.2 V–2.0 V cycle was repeated, and in the third discharge, the cell capacity was evaluated. As a result, it was 450 mAh (average of nine cells). Any of nine cells did not cause short-circuit.

Comparative Example 15

In the same manner as in Example 13, except that a copper foil having a thickness of 18 μm was used as the current collector of the positive electrode, ten cells were assembled. Cells were allowed to stand at room temperature for twenty days, and then one of them was decomposed. As a result, almost all of the lithium metal was remained.

Each of nine remainder cells was discharged at a constant current of 70 mA until the cell voltage became 2.0 V and charged at a constant current of 150 mA until the cell voltage became 4.2 V and held at a constant voltage of 4.2 V for totally 12 hours.

Subsequently, each of the above cells was discharged at a constant current of 70 mA until the cell voltage became 2.0 V. This 4.2 V–2.0 V cycle was repeated, and in the third discharge, the cell capacity was evaluated. As a result, it was 450 mAh (average of nine cells). Any of nine cells did not cause short-circuit.

Comparative Example 16

In the same manner as in Example 13, a PAS negative electrode having a thickness of 290 μm and a positive electrode having a thickness of 438 μm were obtained. Using the positive electrode (2.0×3.0 cm²), PAS negative electrode (2.2×3.2 cm²) and a polypropylene separator having a thickness of 25 μm, ten cells wherein the positive electrode, separator and negative electrode (seven negative electrodes) are laminated were assembled. As two outer negative electrodes, one having a thickness of 234 μm obtained by peeling off one of the above negative electrodes molded on both surfaces was used. A lithium metallic foil (33 µm, 2.0×3.0 cm², 1.5×2.0 cm² with respect to two outer electrodes) as the lithium metal was laminated on the positive electrode. The opposed area (6 cm²×6+3 cm²×2)=42 cm²) of lithium was 50% of the area of the positive electrode (6 cm²×14 (both surfaces×6, one surface×2)=84 cm²). The amount of the lithium metal was about 250 mAh/g based on the negative electrode PAS. The total thickness of the electrodes, separator and lithium metal was almost the same as that in Example 10 and the electrolytic solution is also the same as that in Example 10. The total amount of lithium contained the cell was 1550 mAh/g based on the negative electrode PAS in the cell. Immediately after pouring the electrolytic solution, the cell was charged at a constant current of 150 mA for four hours. Cells were allowed to stand at room temperature for seven days, and then one of them was decomposed. As a result, the lithium metal completely disappeared.

Each of nine remainder cells was discharged at a constant current of 70 mA until the cell voltage became 2.0 V and charged at a constant current of 150 mA until the cell voltage became 4.2 V and held at a constant voltage of 4.2 V for totally 12 hours. Subsequently, each of the above cells was discharged at a constant current of 70 mA until the cell voltage became 2.0 V. This 4.2 V–2.0 V cycle was repeated, and in the third discharge, the cell capacity was evaluated. As a result, it was 650 mAh (average of nine cells). Any of nine cells did not cause short-circuit.

It is a very complicated method, which is not suited for industrial production, to attach a lithium foil having a thickness of about 30 µm as a lower limit of the thickness for mass-production of lithium on each one negative electrode, like Comparative Example 10 and Comparative Example 16. As is apparent from Examples 10, 11, 13 and 14, in order to reduce the thickness of the electrode so as to improve the charge and discharge characteristics, a further thin lithium foil is required, whereby it becomes more difficult to conduct mass production.

As is apparent from Examples 10 to 15, the present invention provides a method of carrying a lithium originating in the negative electrode having large freedom of design such as discharge characteristics in a cell comprising lithium originating in the negative electrode, namely, a cell wherein lithium is previously carried on the negative electrode.

The Examples in a cylindrical cell will be described below.

EXAMPLE 16

In the same manner as in Example 10, a PAS negative electrode having a thickness of 210 µm and a positive electrode having a thickness of 300 µm were obtained. Using the positive electrode (5.4 cm in width×34.0 cm in length), the PAS negative electrode (5.6 cm in width×36.0 cm in length) and a polypropylene separator having a thickness of 25 µm, ten cylindrical cells were assembled. To contact-bond a lithium metallic foil, both surfaces of the negative electrode were provided with a portion (4.8 cm) made only of a current collector, on which no active material of negative electrode was formed (total length of the negative electrode is 36.0 cm+4.8 cm).

One obtained by contact-bonding the lithium metallic foil (180 µm, 5.4×4.8 cm²) on the current corrector of negative electrode was used and arranged to face the negative electrode and positive electrode as shown in FIG. 7, and then wound to obtain a wound-type cylindrical cell. The area (25.92 cm²) of lithium was 6.4% of the area of the negative electrode (403.2 cm²). The amount of the lithium metal was about 250 mAh/g based on the negative electrode PAS. As the electrolytic solution, a solution of LiPF$_6$ at a concentration of 1 mol/l in a 1:1 (weight ratio) mixed solution of ethylene carbonate and diethyl carbonate was used.

The total amount of lithium contained in the cell was 1500 mAh/g based on the negative plate PAS. Cells were allowed to stand at room temperature for seven days, and then one of them was decomposed. As a result, the lithium metal completely disappeared.

Each of nine remainder cells was charged at a constant current of 400 mA until the cell voltage became 4.2 V and held at a constant voltage of 4.2 V for totally 12 hours. Subsequently, each of the above cells was discharged at a constant current of 200 mA until the cell voltage became 2.0 V. This 4.2 V–2.0 V cycle was repeated, and in the third discharge, the cell capacity was evaluated. As a result, it was 2000 mAh (average of nine cells). Any of nine cells did not cause short-circuit.

EXAMPLE 17

In the same manner as in Example 13, a PAS negative electrode having a thickness of 210 µm and a positive electrode having a thickness of 300 µm were obtained. As the current collector of the positive electrode, a stainless steel punched metal (SUS316) having a thickness (porosity: 7%) was used. Using the positive electrode (5.4 cm in width×34.0 cm² in length), the PAS negative electrode (5.6 cm in width×36.0 cm² in length) and a polypropylene separator having a thickness of 25 µm, ten cylindrical cells (18650 type) were assembled.

To contact-bond a lithium metallic foil, both surfaces of the positive electrode were provided with a portion (5.2 cm) made only of a current collector, on which no active material of positive electrode was formed (total length of the positive electrode is 37.0 cm+5.2 cm). One obtained by contact-bonding the lithium metallic foil (180 µm, 5.4×4.8 cm²) on the current corrector of positive electrode was used and arranged to face the negative electrode and positive electrode as shown in FIG. 8, and then wound to obtain a wound-type cylindrical cell. The area (25.92 cm²) of lithium was 7.1% of the area of the positive electrode (399.6 cm²). The amount of the lithium metal was about 250 mAh/g based on the negative electrode PAS. As the electrolytic solution, a solution of LiPF$_6$ at a concentration of 1 mol/l in a 1:1 (weight ratio) mixed solution of ethylene carbonate and diethyl carbonate was used. The total amount of lithium contained in the cell was 1500 mAh/g based on the negative plate PAS. Immediately after pouring the electrolytic solution, the cell was charged at a constant current of 500 mA for four hours. Cells were allowed to stand at room temperature for seven days, and then one of them was decomposed. As a result, the lithium metal completely disappeared.

Each of nine remainder cells was discharged at a constant current of 200 mA until the cell voltage became 2.0 V and charged at a constant current of 400 mA until the cell voltage became 4.2 V and held at a constant voltage of 4.2 V for totally 12 hours. Subsequently, each of the above cells was discharged at a constant current of 200 mA until the cell voltage became 2.0 V. This 4.2 V–2.0 V cycle was repeated, and in the third discharge, the cell capacity was evaluated. As a result, it was 1980 mAh (average of nine cells). Any of nine cells did not cause short-circuit.

Comparative Example 17

In the same manner as in Example 10, a PAS negative electrode having a thickness of 210 µm and a positive electrode having a thickness of 300 μm were obtained. Using the positive electrode (5.4 cm in width×34.5 cm² in length) PAS negative electrode (5.6 cm in width×36.5 cm² in length) and a polypropylene separator having a thickness of 25 μm, ten cells were assembled. Lithium was not arranged in the cell.

As the electrolytic solution, a solution of $LiPF_6$ at a concentration of 1 mol/l in a 1:1 (weight ratio) mixed solution of ethylene carbonate and diethyl carbonate was used. The total amount of lithium contained in the cell was 1500 mAh/g based on the negative plate PAS.

Each of nine remainder cells was charged at a constant current of 400 mA until the cell voltage became 4.2 V and held at a constant voltage of 4.2 V for totally 12 hours. Subsequently, each of the above cells was discharged at a constant current of 200 mA until the cell voltage became 2.0 V. This 4.2 V–2.0 V cycle was repeated, and in the third discharge, the cell capacity was evaluated. As a result, it was 1400 mAh (average of nine cells). Any of ten cells did not cause short-circuit.

As described above, in case the amount of lithium originating in the negative electrode is 0 mAh/g, sufficient capacity was not obtained.

EXAMPLE 18

In the same manner as in Example 13, a PAS negative electrode having a thickness of 200 μm was obtained. Then, 100 parts by weight of $V_2O_5$ (second type of positive electrode) and 10 parts by weight of acetylene black were sufficiently mixed with a solution of 3.5 parts by weight of polyvinylidene fluoride powder in 80 parts by weight of N-methyl pyrrolidone to obtain a slurry. The slurry was molded on both surfaces of an aluminum punched metal having a thickness of 30 μm (porosity: 7%) and then pressed to obtain a positive electrode having a thickness of 580 μm.

Using the positive electrode (2.0×3.0 cm²), the PAS negative electrode (2.2×3.2 cm²) and a polypropylene separator having a thickness of 25 μm, ten cells wherein the positive electrode, separator and negative electrode (nine negative electrodes) are laminated shown in FIG. 1 were assembled. As two outer negative electrodes, one having a thickness of 304 μm obtained by peeling off one of the above negative electrodes molded on both surfaces was used.

As the lithium metal, one obtained by contact-bonding a lithium metallic foil (800 μm, 2.0×3.0 cm²) on a stainless steel net having a thickness of 80 μm was used and was arranged to face the positive electrode. The positive electrodes (one surface×2, both surfaces×8) were respectively made contact with the stainless steel net, on which lithium was contact-bonded, through welding. The opposed area (6 cm²) of lithium was 5.6% of the area of the positive electrode (6×18 (both surfaces×8, one surface×2)=108 cm²). The amount of the lithium metal was about 1000 mAh/g based on the negative electrode PAS. The electrolytic solution was the same as that used in Example 10. The total amount of lithium was 1050 mAh/g based on the negative electrode PAS in the cell. Cells were allowed to stand at room temperature for seven days, and then one of them was decomposed. As a result, the lithium metal completely disappeared.

Each of nine remainder cells was charged at a constant current of 150 mA until the cell voltage became 3.3 V and held at a constant voltage of 3.3 V for totally 12 hours. Subsequently, each of the above cells was discharged at a constant current of 70 mA until the cell voltage became 1.0 V. This 3.3 V–1.0 V cycle was repeated, and in the third discharge, the cell capacity was evaluated. As a result, it was 470 mAh (average of nine cells). Any of ten cells did not cause short-circuit.

The results are summarized in Table 14.

TABLE 14

| | Porosity of current collector positive electrode/negative electrode (%) | Yield of current collector positive electrode/negative electrode (%) | Cell capacity (mAh) | Short-circuit percentage (%) | Remarks |
|---|---|---|---|---|---|
| Example 10 | 7/7 | 100/100 | 720 | 0 | |
| Example 11 | 20/28 | 80/80 | 650 | 0 | |
| Example 12 | 20/28 | 80/80 | 650 | 0 | |
| Example 13 | the same as in Example 10 | the same as in Example 10 | 720 | 0 | |
| Example 14 | the same as in Example 11 | the same as in Example 11 | 650 | 0 | |
| Example 15 | the same as in Example 12 | the same as in Example 12 | 650 | 0 | |
| Comp. Example 6 | 88/70 | 50/60 | 710 | 33 | |
| Comp. Example 7 | 35/40 | 60/70 | 640 | 11 | |
| Comp. Example 8 | 0/7 | 100/100 | 450 | 0 | |
| Comp. Example 9 | 7/0 | 100/100 | 450 | 0 | |
| Comp. Example 10 | 7/7 | 100/100 | 680 | 0 | No productivity |
| Comp. Example 11 | the same as in Comp. Example 6 | the same as in Comp. Example 6 | 710 | 33 | |
| Comp. Example 12 | the same as in Comp. Example 7 | the same as in Comp. Example 7 | 640 | 11 | |
| Comp. Example 13 | 0/0 | 0/0 | 450 | 0 | |
| Comp. Example 14 | the same as in Comp. Example 8 | the same as in Comp. Example 8 | 450 | 0 | |
| Comp. Example 15 | the same as in Comp. Example 9 | the same as in Comp. Example 9 | 450 | 0 | |
| Comp. Example 16 | the same as in Comp. Example 10 | the same as in Comp. Example 10 | 650 | 0 | No productivity |
| Example 16 | 7/7 | 100/100 | 2000 | 0 | |
| Example 17 | the same as in Example 12 | the same as in Example 12 | 1980 | 0 | |
| Comp. Example 17 | 7/7 | 100/100 | 1400 | 0 | free from Li originating in negative electrode |
| Example 18 | the same as in Example 10 | the same as in Example 10 | 470 | 0 | |

INDUSTRIAL APPLICABILITY

As described above, the organic electrolytic cell according to the present invention is extremely useful because of its easy production, high capacity and high voltage, excellent charge and discharge characteristics, and high safety.

FIG. 10

Embodiment of electrode using a current collector having a porosity of 7% (punched metal) Embodiment of electrode using a current collector having a porosity of 80% (expanded metal)

What is claimed is:

1. An organic electrolytic cell comprising a positive electrode, a negative electrode and a solution of lithium salt in an aprotic organic solvent as an electrolytic solution, wherein a current collector of the positive electrode and a current collector of the negative electrode are respectively provided with pores piercing from the front surface to the back surface and a porosity of each current collector is not less than 1% and not more than 30%, an active material of the negative electrode is capable of reversibly carrying lithium ions, and lithium ions originating in the negative electrode are is carried by electrochemical contact with a lithium metal layer arranged to face the negative or positive electrode and an opposed area of lithium is not more than 40% of an area of the negative electrode.

2. The organic electrolytic cell according to claim 1, wherein the active material of the negative electrode is an infusible and insoluble substrate having a polyacene skeletal structure and a hydrogen/carbon atomic ratio of 0.5 to 0.05, the substrate being a heat-treated product of an aromatic condensation polymer.

3. The organic electrolytic cell according to claim 2, wherein the total amount of lithium contained the cell corresponds to a capacity of not less than 500 mAh/g and the amount of lithium originating in the negative electrode corresponds to a capacity of not less than 100 mAh/g, based on the active material of the negative electrode.

4. An organic electrolytic cell comprising a positive electrode, a negative electrode and a solution of lithium salt in an aprotic organic solvent as an electrolytic solution, wherein a current collector of the positive electrode and a current collector of the negative electrode are respectively provided with pores piercing form the front surface to the back surface and a porosity of each current collector is not less than 1% and not more than 30%, an active material of the positive electrode and an active material of the negative electrode are capable of reversibly carrying lithium ions, and at least one portion of lithium ions originating in the positive electrode is carried by electrochemical contact with a lithium metal layer arranged to face the negative electrode or positive electrode and an opposed area of lithium is not more than 40% of an area of the positive electrode.

5. The organic electrolytic cell according to claim 4, wherein the active material of the negative electrode is an infusible and insoluble substrate having a polyacene skeletal structure and a hydrogen/carbon atomic ratio of 0.5 to 0.05, the substrate being a heat-treated product of an aromatic condensation polymer.

6. A method of producing the organic electrolytic cell of claim 1.

7. A method of producing the organic electrolytic cell of claim 4.

* * * * *